(12) United States Patent
Maiya et al.

(10) Patent No.: US 9,526,099 B2
(45) Date of Patent: Dec. 20, 2016

(54) APPARATUS AND METHODS FOR EARLY TRANSPORT FORMAT DETERMINATION

(71) Applicant: QUALCOMM Incorporated, San Diego, CA (US)

(72) Inventors: Shashank Vishwanatha Maiya, Sunnyvale, CA (US); Nate Chizgi, Sunnyvale, CA (US); Roee Cohen, D. N. Hasharon Hatichon (IL); Harish Venkatachari, Sunnyvale, CA (US); Sharif Ahsanul Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 14/167,806

(22) Filed: Jan. 29, 2014

(65) Prior Publication Data

US 2015/0009965 A1    Jan. 8, 2015

Related U.S. Application Data

(60) Provisional application No. 61/842,824, filed on Jul. 3, 2013, provisional application No. 61/845,785, filed on Jul. 12, 2013, provisional application No. 61/859,612, filed on Jul. 29, 2013, provisional application No. 61/859,619, filed on Jul. 29, 2013.

(51) Int. Cl.
*H04W 72/04* (2009.01)
*H04L 1/00* (2006.01)

(52) U.S. Cl.
CPC ........ *H04W 72/0446* (2013.01); *H04L 1/0038* (2013.01)

(58) Field of Classification Search
CPC .................. H04W 72/0446; H04L 1/0038
See application file for complete search history.

(56) References Cited

U.S. PATENT DOCUMENTS

| | | |
|---|---|---|
| 6,108,372 A | 8/2000 | Tidemann, Jr. et al. |
| 2002/0006138 A1 | 1/2002 | Odenwalder |
| 2002/0069380 A1 | 6/2002 | El-Maleh et al. |
| 2002/0141516 A1 | 10/2002 | Willenegger |
| 2004/0168113 A1 | 8/2004 | Murata et al. |
| 2007/0280171 A1 | 12/2007 | Carmon et al. |
| 2012/0281675 A1 | 11/2012 | Liang et al. |
| 2013/0089131 A1 | 4/2013 | Shelby et al. |
| 2013/0142223 A1 | 6/2013 | Kuo |
| 2013/0223412 A1 | 8/2013 | Sambhwani |

(Continued)

OTHER PUBLICATIONS

International Search Report and Written Opinion—PCT/US2014/043554—ISA/EPO—Jan. 20, 2015. (21 total pages).

(Continued)

*Primary Examiner* — Dang Ton
*Assistant Examiner* — Mandish Randhawa
(74) *Attorney, Agent, or Firm* — Arent Fox LLP

(57) ABSTRACT

Apparatus and methods include receiving one or more first signals at a user equipment (UE) during a first portion of a transmission time interval (TTI), wherein the one or more first signals are transmitted by a network to the UE using a transport format; determining the transport format upon receiving the one or more first signals and prior to a second portion of the TTI subsequent to the first portion of the TTI; and receiving one or more second signals at the UE during a second portion of the TTI.

28 Claims, 14 Drawing Sheets

(56) References Cited

U.S. PATENT DOCUMENTS

2013/0242889 A1    9/2013   Khoryaev et al.

OTHER PUBLICATIONS

Wang M M., et al., "Optimal blind transport format detection for UMTS uplink", Wireless Personal Multimedia Communications, 2002. The 5th International Symposium on Oct. 27-30, 2002, IEEE, Piscataway, NJ, USA, vol. 1, Oct. 27, 2002 (Oct. 27, 2002), pp. 102-106, XP010619056, ISBN: 978-0-7803-7442-3 section "Algorithm Description", last paragraph.

APPARATUS AND METHODS FOR EARLY TRANSPORT FORMAT DETERMINATION

CLAIM OF PRIORITY UNDER 35 U.S.C. §119

The present Application for Patent claims priority to the following applications assigned to the assignee hereof and hereby expressly incorporated by reference herein:

U.S. Provisional Application No. 61/842,824 entitled "Apparatus and Methods for Early Transport Format Determination Based on Previously Decoded Packets" filed Jul. 3, 2013;

U.S. Provisional Application No. 61/845,785 entitled "Method and Apparatus for Joint Transport Format Combination Index (TFCI) Estimation" filed Jul. 12, 2013;

U.S. Provisional Application No. 61/859,612 entitled "Apparatus and Method for Generating Noise Power Estimates Using Multiple Channels in a Wireless Communication System" filed Jul. 29, 2013; and U.S. Provisional Application No. 61/859,619 entitled "Apparatus and Method for Generating Estimated Signal Power Using Transmitted Data Bits with Power Offset in a Wireless Communication System" filed Jul. 29, 2013.

BACKGROUND

Aspects of the present disclosure relate generally to wireless communication systems, and more particularly, to apparatus and methods for early transport format determination in wireless communications.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, in W-CDMA voice traffic transmission, the network uses one out of multiple possible transport formats to send voice data to a user equipment (UE). Selection of a particular transport format depends on the data traffic conditions. In order to properly decode the received voice data, the UE needs to determine the transport format used by the network in transmitting the voice data. Currently, when the UE has to perform blind transport format detection (BTFD) in the absence of any information about the transport format used by the network during a transmission time interval (TTI), the UE waits until the entire signal transmission during the TTI is received, and then attempts to determine the transport format used by the network during that TTI.

Generally, the downlink signal transmitted from a base station and received by a mobile station may be represented as the desired signal convolved with a multi-path channel and added with noise and interference from other sources. For example, in a W-CDMA network, the downlink multi-path channel may cause inter-symbol-interference to the signal, and may prevent the mobile station from achieving a high data rate. To improve the signal-to-interference ratio for a mobile station, the energy of the signal may be increased to appropriate levels. However, increasing the energy of one mobile station increases the interference of that mobile station to other nearby mobile stations. As such, a radio communication system may determine a tradeoff among the requirements of different mobile stations sharing the same common channel. For example, a steady state condition may be reached when the signal-to-interference ratio (SIR) requirements for the mobile stations within a given radio communication system are satisfied by using power levels at each mobile station that are neither too high nor too low. Achieving such a steady state may require signal/noise power estimation at each mobile receiver so that signal-to-interference power levels are appropriately maintained.

As the demand for mobile broadband access continues to increase, research and development continue to advance the UMTS technologies not only to meet the growing demand for mobile broadband access, but to advance and enhance the user experience with mobile communications. Thus, in this case, there is a desire for improvements in determination of the transport format that is used during a TTI. Also, there is a desire for improved signal and/or noise power estimation at a mobile terminal.

SUMMARY

Aspects of the present disclosure relate generally to wireless communication systems, and more particularly, to apparatus and method for early transport format determination in wireless communications.

In one aspect, the disclosure provides a method of wireless communication that includes receiving one or more first signals at a user equipment (UE) during a first portion of a transmission time interval (TTI), wherein the one or more first signals are transmitted by a network to the UE using a transport format; determining the transport format upon receiving the one or more first signals and prior to a second portion of the TTI subsequent to the first portion of the TTI; and receiving one or more second signals at the UE during the second portion of the TTI.

In another aspect, the disclosure provides an apparatus for wireless communication that includes a processing system configured to receive one or more first signals at a user equipment (UE) during a first portion of a transmission time interval (TTI), wherein the one or more first signals are transmitted by a network to the UE using a transport format; determine the transport format upon receiving the one or more first signals and prior to a second portion of the TTI subsequent to the first portion of the TTI; and receive one or more second signals at the UE during the second portion of the TTI.

In a further aspect, the disclosure provides an apparatus for wireless communication that includes means for receiving one or more first signals at a user equipment (UE) during a first portion of a transmission time interval (TTI), wherein the one or more first signals are transmitted by a network to the UE using a transport format; means for determining the transport format upon receiving the one or more first signals and prior to a second portion of the TTI subsequent to the first portion of the TTI; and means for receiving one or more second signals at the UE during the second portion of the TTI.

In yet another aspect, the disclosure provides a computer program product for wireless communication that includes a computer-readable medium including code for receiving one or more first signals at a user equipment (UE) during a first portion of a transmission time interval (TTI), wherein the one or more first signals are transmitted by a network to the UE using a transport format; code for determining the transport format upon receiving the one or more first signals and prior to a second portion of the TTI subsequent to the first portion of the TTI; and code for receiving one or more second signals at the UE during the second portion of the TTI subsequent.

These and other aspects of the present disclosure will become more fully understood upon a review of the detailed description, which follows.

DETAILED DESCRIPTION

Figure 1:
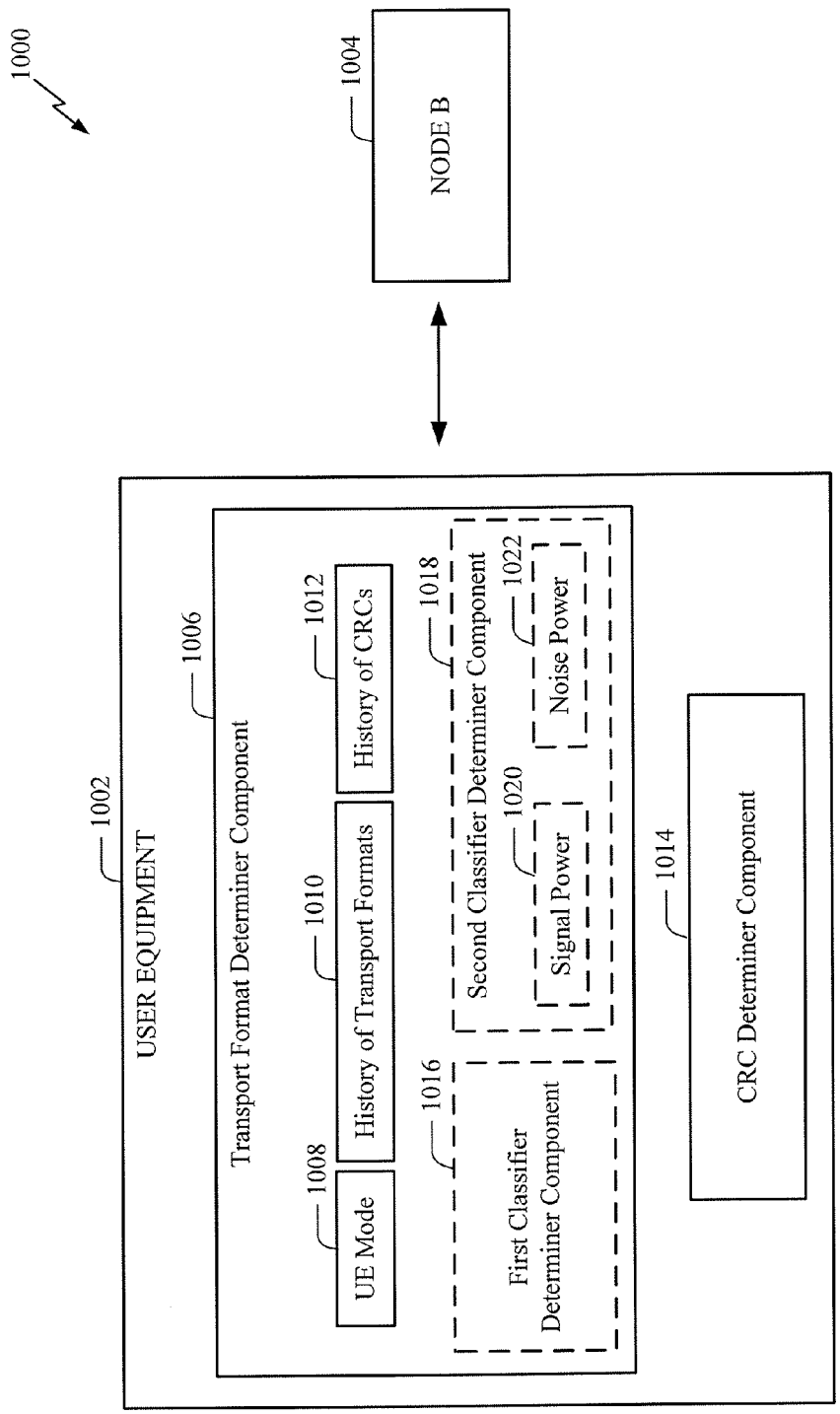
FIG. 1 is a schematic block diagram of one aspect of a system for early transport format determination in wireless communications.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to some aspects of the present disclosure, methods and apparatus are provided that use an inherent voice activity pattern to reliably detect the transport format used by a network to transmit voice data. According to these aspects, the transport format used by the network during a TTI is determined before the entire signal transmission during the TTI is received at a UE, thereby providing early transport format information at the UE.

Generally, a network may use one out of multiple possible transport formats to transmit voice data, and choosing a particular transport format depends on the traffic conditions. For example, the network may be in two possible modes during voice transmission: voice activity (VA) mode, when there is speech data to transmit, and silent activity (SA) mode, when there is no speech data to transmit. The probability of transition between these two modes is relatively low since the duration of the VA mode and the SA mode is usually relatively long (e.g., few seconds). Accordingly, during the SA mode the network may transmit at a lower rate using lower rate transport formats, and during the VA mode the network may transmit at a higher rate using higher rate transport formats.

In some aspects, if the UE has apriori information about the transport format patterns that a network would use to transmit during VA modes and SA modes, a current transport format used by the network during a current TTI may be predicted based on the information of the previously decoded TTIs and the assumption that the network is more likely to stay in its current mode rather than transition to a mode different than its current mode. Accordingly, in these aspects, the transport format used by the network to transmit a current TTI is determined based on the mode that the UE is currently in and based on the pattern of transport formats that the network would use in different modes.

In some aspects, the UE can be previously trained during a call to learn the pattern of transport formats that the network uses during SA modes and/or VA modes. Accordingly, in these aspects, the transport format used by the network to transmit a current TTI may be determined based on the mode that the UE is currently in and based on the previously learned pattern of transport formats that the network would use in different modes.

In some aspects, the UE assumes that the network remains in a previous mode (e.g., a VA mode or an SA mode) until the UE successfully decodes a TTI that corresponds to either a transition transport format (e.g., a transport format used by the network to indicate a transition from one mode to another) or a transport format unique to the mode that is the complementary mode of the previous mode of the network (e.g., the SA mode being complementary to the VA mode, and vice versa). A TTI may be considered successfully decoded when the decoded TTI passes a cyclic redundancy check (CRC).

In some aspects, where fixed-positions rate matching is used (e.g., where the number of bits of the physical channel allocated to each transport channel is fixed irrespective of the selected transport format combination, and the bit positions used to transmit each transport format are fixed and known at the UE), the information about the bit positions together with the information about the current transport format may be used to improve the accuracy of the signal to interference ratio (SIR) estimates at the UE. Accordingly, in these aspects, improved SIR estimates can be used to improve SIR-dependent UE applications, such as power control algorithms of the UE or in-sync/out-of-sync handling procedures of the UE.

In some aspects, early determination of the transport format used by the network may be used by the UE for determining an early termination of a frame. For example, in some aspects, early determination of the transport format may be used for determining early NULL/SID packets. In these aspects, for example, in the event of an early termination of a voice frame, early transport format determination may be used to determine whether or not a dedicated physical data channel (DPDCH) requires demodulation at the UE. If the transport format is reliably decoded early on in a dedicated traffic channel (DTCH) TTI, then the UE may determine that there is a data channel that requires demodulation; and consequently decode the data channel early on, or otherwise the UE may determine that there is no requirement for decoding the data channel; and consequently enter a UE low power mode. Accordingly, in these aspects, power savings may be achieved at the UE.

In some aspects, a UE may support multiple co-existing transmitter/receiver (TX/RX) technologies. For example, a UE may support dual subscriber identity module (SIM) dual-active (DSDA) and its variants (e.g., dual-SIM dual-standby (DSDS), three-SIM three-active (TSTA), three-SIM three-standby (TSTS), quad-SIM quad-active (QSQA), quad-SIM quad-standby (QSQS)), or the UE may support single-SIM with a co-existing TX/RX such as Bluetooth (BT), wireless fidelity (WiFi), or global positioning system (GPS). In these aspects, for example, one active call of the UE in one TX/RX technology may cause interference in another call of the UE in another TX/RX technology. As such, early demodulation of the transport format within a DTCH TTI of one call of the UE may be used to pass information about voice or data activity of that call to another call of the UE. For example, if the transport format of one call of one TX/RX technology indicates no traffic, then a high level of interference can be allowed on other calls of other TX/RX technologies during this TTI, so that other co-existing and interfering TX/RX technologies use the remaining slots of this TTI. Also, if the transport format of one call of one TX/RX technology indicates a control signaling message, then a lower level of interference may be tolerated in this TTI, and other coexisting interfering TX technologies may reduce or stop transmission. Furthermore, having a soft measure of the likelihood of control signaling message may be used as a metric. For example, a soft measure may be used to indicate a confidence level in a decision, and may be, e.g., a floating number value. For example, in one aspect, instead of making a hard decision on whether the transport format includes control signaling or not, a soft decision may be made on how likely it is that a transport format is carrying control signaling. That is, in this example aspect, such soft measure may be used as a metric to determine if the transport format corresponds to a control signaling message or not.

In some aspects, the UE may use early transport format determination to perform early detection of the dedicated control channel (DCCH). For example, instead of waiting for, e.g., an 8 or 10 ms boundary to make a determination whether a TTI includes DCCH information, early transport format determination may be used to provide the UE with a longer duration in which the UE has the opportunity to request additional power being transmitted from the network, such that the DCCH decoding reliability at the UE is improved.

In some aspects, the UE may use early transport format determination to detect the presence of a false CRC in the current TTI. For example, in these aspects, the transport format used by the network to transmit a current TTI may be determined and used to decode the current TTI, and then CRC may be performed on the decoded 111 to detect whether a false CRC is present or not.

Referring to FIG. 1, in one aspect, system 1000 includes UE 1002 that is communicating with Node B 1004. UE 1002 may receive data including voice data from node B 1004. In order to properly receive and decode data received from Node B 1004 during a TTI, UE 1002 may need to determine a transport format used by Node B 1004 to transmit data in that TTI. For example, UE 1002 may include transport format determiner component 1006 that determines the transport format used by Node B 1004 to transmit data such as voice data to UE 1002. In some aspects, transport format determiner component 1006 may determine the transport format used by Node B 1004 to transmit data during a current TTI and before the entire signal transmission during TTI is received at UE 1002. Node B 1004 may use one out of multiple possible transport formats to send voice data to UE 1002. The choice of a particular transport format may depend on the traffic conditions. For example, in some aspects, when Node B 1004 is in SA mode (e.g., there is no speech data to transmit to UE 1002), Node B 1004 may transmit at a lower rate using lower transport formats, and when Node B 1004 is in VA mode (e.g., there is voice data to transmit to UE 1002), Node B 1004 may transmit at a higher rate using higher transport formats.

In some aspects, when UE 1002 has to perform BTFD in the absence of any information about the transport format used by Node B 1004 during a current TTI, UE 1002 may not wait until the entire TTI is received from Node B 1004, and instead determine the transport format used by Node B 1004 during that TTI based on apriori knowledge of the transport format patterns that Node B 1004 would use to transmit during VA and SA modes, and based on the information of previously decoded TTIs. For example, in some aspects, transport format determiner component 1006 may determine a current transport format being used by Node B 1004 based on one or more of the history of transport formats 1010 that includes previously determined transport formats at UE 1002, the UE mode 1008 which includes VA and SA modes, and a history of CRCs that includes CRCs of previously decoded TTIs which may be determined by CRC determiner component 1014. Further details of the operation of transport format determiner component 1006 are provided as follows.

Figures 2A, 2B:
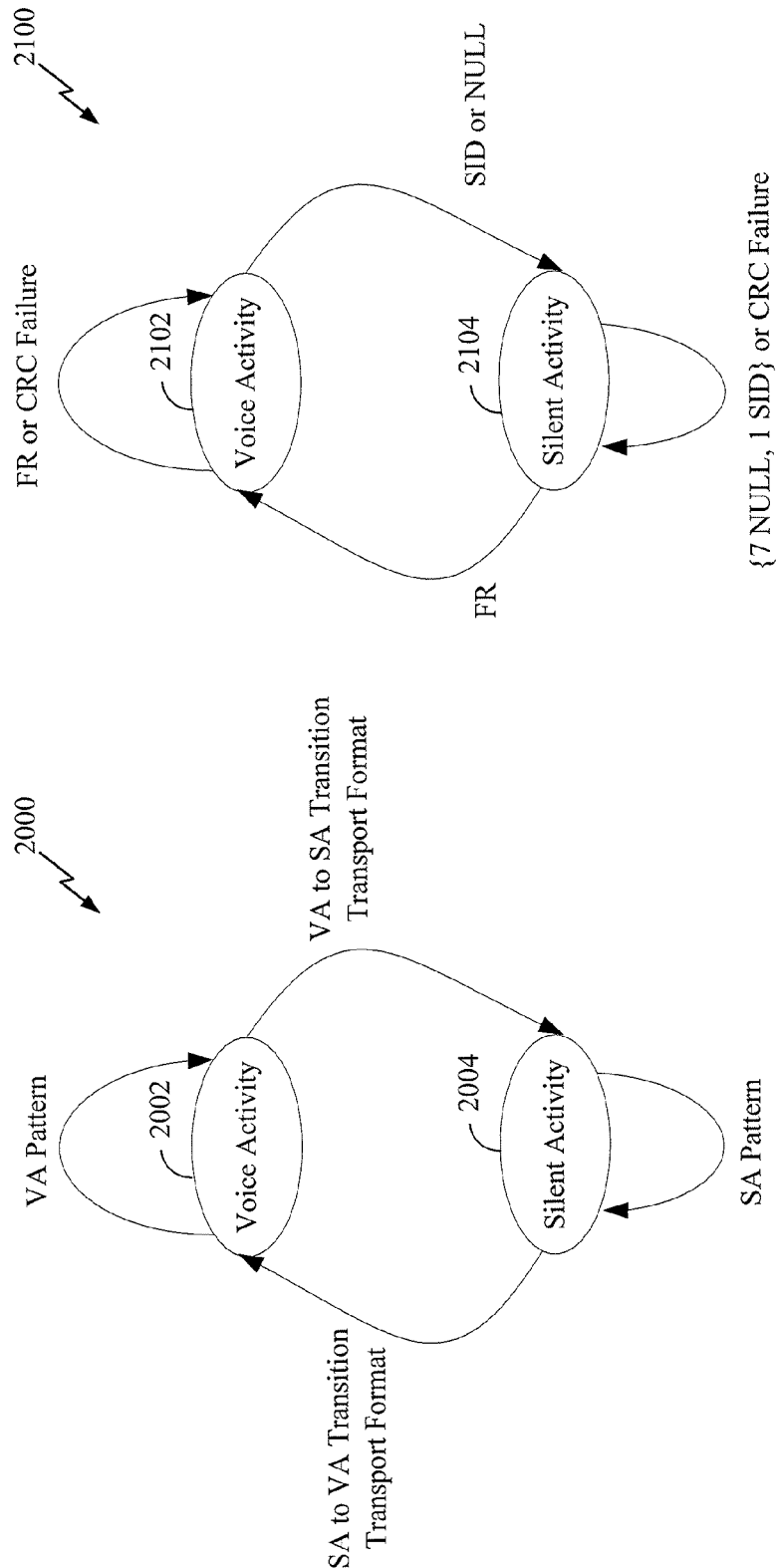
FIGS. 2A and 2B illustrate state diagrams in aspects of the system of FIG. 1.

Generally, during voice data transmission, Node B 1004 may be in one of two different modes: VA mode or SA mode. FIG. 2A illustrates a state diagram 2000 of a typical Node B 1004 during voice data transmission. State diagram 2000 includes VA mode 2002, and SA mode 2004. When Node B 1004 is in VA mode 2002, it remains in VA mode as long as it has speech data to transmit, and continues to transmit data packets in a VA Pattern. Once there are no more speech data packets to transmit (e.g., when there is a momentary pause during a call), Node B 1004 transitions to SA mode 2004 and indicates this transition by transmitting a specific transport format; VA→SA transition transport format. Once in SA mode 2004, Node B 1004 transmits data packets in an SA Pattern until speech transmission resumes. When speech transmission resumes, Node B 1004 transitions from SA mode 2004 to VA mode 2002 and indicates this transition by transmitting a specific transport format; SA→VA transition transport format. Accordingly, during a typical voice data transmission, Node B 1004 may use transport formats in VA or SA patterns, a VA→SA transition transport format, or an SA→VA transition transport format.

In some aspects, for example, Node B 1004 may use an R99 adaptive multi-rate (AMR) coder/decoder (codec) that has three different packet types corresponding to three different transport formats: full rate (FR) packet corresponding to FR transport format, silence indicator (SID) packet corresponding to SID transport format, and NULL packet corresponding to NULL transport format. In these aspects, the specific VA pattern used by Node B 1004 in VA mode is a continuous string of FR transport formats, and the specific SA pattern used by Node B 1004 in SA mode is a pattern of seven NULL transport formats followed by one SID transport format. Also, in these aspects, the VA→SA transition transport format is an SID transport format, and the SA→VA transition transport format is an FR transport format. In some aspects, in order to predict the transport format that node B 1004 uses to transmit a current TTI, transport format determiner component 1006 may use UE mode 1008 (which is the mode the UE is currently in) and the apriori knowledge of the pattern of transport formats that Node B 1004 would use during VA mode 2002 and SA mode 2004. In some aspects, UE 1002 may be trained during a call to learn the pattern of transport formats that Node B 1004 would use during VA mode 2002 and SA mode 2004.

An example state diagram 2100 of UE 1002 is shown in FIG. 2B. Similar to state diagram 2000 of Node B 1004, state diagram 2100 of UE 1002 includes VA mode 2102 and SA mode 2104 and attempts to follow the mode of Node B 1004. In some aspects, UE 1002 may assume that Node B 1004 continues to remain in its previous mode (either VA mode or SA mode), until UE 1002 decodes a TTI which corresponds to either a transition transport format (e.g., a VA→SA transition transport format or an SA→VA transition transport format) or a transport format unique to the mode that is the complementary mode of the previous mode of Node B 1004 (the SA mode being complementary to the VA mode, and vice versa).

In some aspects, based on a current mode, UE 1002 decodes a current TTI, and determines if the decoded TTI has resulted in a CRC failure, where the CRC failure is determined by the CRC determiner component 1014. If a CRC failure is detected, UE 1002 continues to remain in the previous UE mode 1008. Accordingly, a CRC failure results in retaining a current mode of UE 1002. If no CRC failure is detected, then the next mode of UE 1002 is determined based on the transport format that resulted in the CRC pass. If a CRC pass is detected on an FR transport format, UE 1002 retains VA mode 2102 if the previous mode is VA mode 2102, or transitions to VA mode 2102 if the previous mode is SA mode 2104. If a CRC pass is detected on an SID or NULL transport format, UE 1002 retains SA mode 2104 if the previous mode is SA mode 2104, or transitions to SA mode 2104 if the previous mode is VA mode 2102.

In some aspects, Node B 1004 may indicate its transition from VA mode 2002 to SA mode 2004 and use an SID transport format as a VA→SA transition transport format. Upon receiving the SID transport format, UE 1002 that is still in VA mode 2002 and expects to receive an FR transport format, observes a CRC fail on the SID transport format. Upon observing a CRC fail on the SID transport format, UE 1002 continues to remain in VA mode 2102, but decodes the next TTI in a NULL transport format. Consequently, if after transmitting the SID transport format, Node B 1004 which is now in SA mode 2004 transmits a NULL transport format, UE 1002 may indicate a CRC pass on the NULL transport format even though UE 1002 is in VA mode 2102. UE 1002 then transitions to SA mode 2104 upon observing the CRC pass on the NULL transport format.

In some aspects, when UE 1002 is in SA mode 2104, the predicted current transport format is either NULL or SID depending on how many consecutive NULL packets have been previously decoded. For example, if seven consecutive NULL transport formats have been decoded, then the predicted current transport format is SID, and otherwise, the predicted current transport format is NULL.

In the following, an example scenario of Node B 1004 transmissions and corresponding transport format determinations at UE 1002 is provided. For example, Node B 1004 may transmit a sequence of 120 FRs, 20 sets of {1 SID, 7 NULLs}, 80 FRs, 15 sets of {1 SID, 7 NULLs}. In other words, Node B 1004 transmits 120 consecutive FR TTIs, followed by 20 repetitions of SID and 7 NULL TTIs, followed by 80 FR TTIs, followed by 15 repetitions of SID and 7 NULL TTIs. In this scenario, UE 1002 detect the TFs as a sequence of 120 FRs, one failed FR, 19 sets of {7 NULLs, 1 SID}, 7 NULLs, one failed SID, 79 FRs, 1 failed FR, 14 sets of {7 NULLs, 1 SID}, and 7 NULLs. Thus, UE 1002 makes only 3 errors (during the 3 transitions of Node B 1004) in decoding the 480 transmitted frames.

In some aspects, since detecting the transport format based only on the previous decoded TTIs may result in errors (e.g., during activity transitions: VA→SA or SA→VA), transport format determiner component 1006 may alternatively or additionally determine the transport format based on other criteria. For example, in some aspects, transport format determiner component 1006 may be configured to estimate the transport format in a current TTI by jointly using decisions from two or more classifiers. In one aspect, for example, transport format determiner component 1006 may include first classifier determiner component 1016 and second classifier determiner component 1018, where first classifier determiner component 1016 determines a first classifier that predicts the current transport format used by the network based on the information of previously decoded TTIs, while second classifier determiner component 1018 determines a second classifier that predicts the current transport format used by the network based on bit energies in a current TTI, e.g., by determining signal energy 1020 and/or noise energy 1022. In some aspects, for example, when fixed-position rate-matching is used, the bit positions in each transport format are fixed and generally known at UE 1002. In these aspects, UE 1002 measures the energies of the received symbols, and the energies may have different values depending on the transport format used by the network (for example, different energy levels that may be correlated to different transport formats). This difference in energies may be used by second classifier determiner component 1018 to determine the transport format used by the network. Accordingly, the reliability of the transport format estimation may be improved by using both of first classifier and second classifier, as compared to using only one classifier.

In an aspect, in the absence of CRC errors at UE 1002, Table 1 shows example transport format estimates based on a first classifier determined by first classifier determiner component 1016, where the two possible transmitted transport formats correspond to the network maintaining the same mode and the network transitioning to a complementary mode.

TABLE 1

Example first classifier results

| First Classifier | Transmitted TF | Reason |
|---|---|---|
| NULL | NULL or FR | If network remains in silent activity, transmitted TF = NULL |
| | | If network transitioned to voice activity, transmitted TF = FR |
| SID | SID or FR | If network remains in silent activity, transmitted TF = SID |
| | | If network transitioned to voice activity, |

TABLE 1-continued

Example first classifier results

| First Classifier | Transmitted TF | Reason |
|---|---|---|
| FR | FR or SID | transmitted TF = FR<br>If network remains in voice activity, transmitted TF = FR<br>If network transitioned to silent activity, transmitted TF = SID |

In an aspect, example joint transport detection results using first and second classifier decisions (provided, respectively, by first classifier determiner component 1016 and second classifier determiner component 1018) are provided in Table 2. For example, if both classifier decisions match, then the joint transport format detection result is equal to the matched decision. If the decisions from the first classifier determiner component 1016 and second classifier determiner component 1018 do not match, then a set of rules may be used to determine the transport format among the reduced subset of possible transport formats provided by first classifier determiner component 1016. In some aspects, for example, the set of rules may be pre-defined at the network and transmitted to UE 1002 or pre-defined at UE 1002 by the network operator. Optionally, in some aspects, the set of rules may be dynamically defined at the network and pushed to UE 1002 by the network operators.

TABLE 2

First example joint transport format detection results

| First Classifier | Second Classifier | | |
|---|---|---|---|
| | NULL | SID | FR |
| NULL | NULL | NULL/FR | NULL/FR |
| SID | SID/FR | SID | SID/FR |
| FR | SID/FR | SID/FR | FR |

In an additional aspect, for example, additional set of rules may be applied. For example, if the first classifier and the second classifier decisions (provided, respectively, by first classifier determiner component 1016 and second classifier determiner component 1018) do not match, and if the second classifier output corresponds to a transition transport format, then the second classifier decision may be considered as the determined transport format. If not, the first classifier decision may be considered as the determined transport format. In an example aspect, the determined transport format for the combinations of the two classifier decision is shown in Table 3.

TABLE 3

Second example joint transport format detection results

| First Classifier | Second Classifier | | |
|---|---|---|---|
| | NULL | SID | FR |
| NULL | NULL | NULL | FR |
| SID | SID | SID | FR |
| FR | FR | SID | FR |

In an aspect, if the first classifier and the second classifier decisions do not match, then the second classifier may be adjusted by using a modified energy threshold. In these aspects, the adjusted second classifier and the first classifier may be used to determine the transport format. In an additional or optional aspect, if the first classifier and the second classifier decisions do not match, then a conservative transport format may be used among the reduced subset of possible transport formats. For example, when over-estimating the transport format (e.g., classifying a transport format as FR when the transmitted transport format is NULL) is costly and may cause performance degradation, a conservative transport format may be used by biasing the decision towards lower transport formats, e.g., NULL. For example, when using a transport format prediction to estimate the received signal energy, over-estimating the transport format is costly since such over-estimating may cause performance degradation and result in greater power consumption at the network. Similarly, when under-estimating the transport format (e.g., classifying a transport format as NULL when the transmitted transport format is FR) is costly, a conservative transport format may be used by biasing the decision towards higher transport formats, e.g., FR.

In an additional or optional aspect, the detection may be improved by giving variable weights to the classifier decisions depending on the application and the reliability of the decisions. For example, in some aspects, the reliability of individual decisions may be related to and/or depend on the application. For example, in some applications where the network transmits signals at high energy, the second classifier decisions may be more reliable than the first classifier decisions. In such aspects, more weight may be given to the second classifier decisions. Further, in some alternative or additional aspects, the decision may be biased more towards the first classifier during the earlier slots of the TTI (since only a few symbols are received up to that point) and the decision bias may gradually change in favor of the second classifier as more symbols are received in the current TTI.

In order to provide the second classifier, some aspects of the present disclosure may enable UE 1002 to estimate signal power using the transmitted bits in the dedicated physical channel (DPCH). For example, in some aspects, second classifier determiner component 1018 may determine signal power 1020 using the transmitted bits in the DPCH. Generally, in the DPCH, the UMTS system provides pilot symbols that are time-multiplexed with the DPDCH, and these pilot symbols are used for signal power estimation. However, in some aspects, the number of dedicated pilot (DP) bits transmitted in a slot of the DPCH is limited, and consequently the signal power estimate may not be very reliable. However, some aspects of the present disclosure use other transmitted bits in the DPCH to provide an improved signal power estimate.

Further, in some aspects, the Common Pilot Channel (CPICH) may employ an orthogonal variable spreading factor (OVSF) code with a spreading factor of 256 and continuously transmit pilot symbols. In these aspects, UE 1002 may estimate noise power using the transmitted bits in the CPICH. For example, in some aspects, second classifier determiner component 1018 may determine noise power 1022 in other channels at different OVSF codes and thereby improve the estimated noise power. In these aspects, the signal to interference ratio (SIR) may then be estimated at UE 1002 during every CPICH slot for power control for various purposes such as handover cell re-selection, closed loop power control, or open loop power control. Also, phasor estimation may be performed in a combined decision directed/data aided (DD/DA) scheme using the DPCCH/DPDCH data stream, or in a DA scheme using the CPICH.

Figure 3:
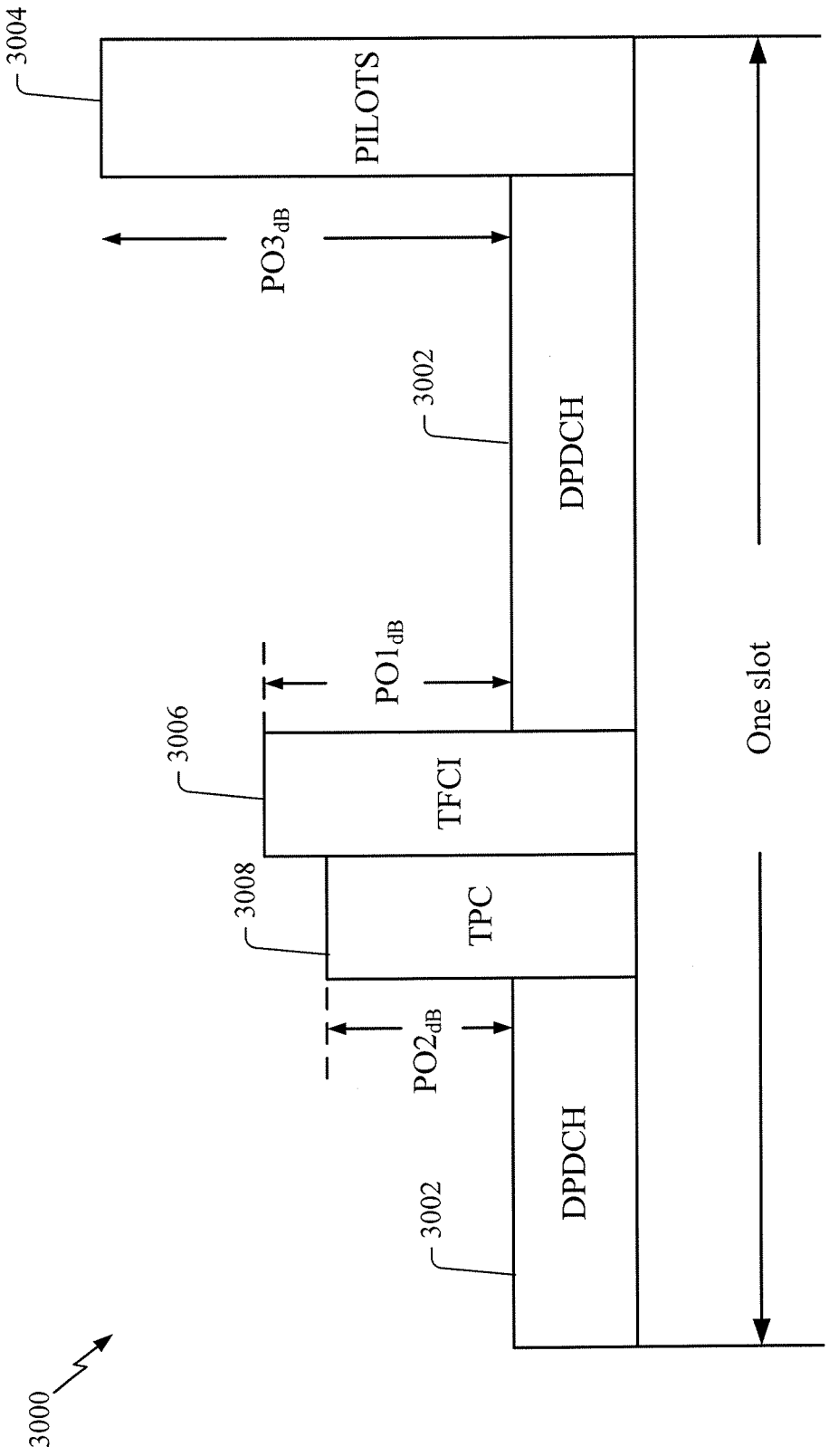
FIG. 3 is a schematic diagram illustrating an example frame structure in aspects of the system of FIG. 1.

Referring now to FIG. 3, a schematic diagram of a first example frame structure 3000 for a typical slot of the DPCH is provided. Each frame of length 10 ms is split into 15 slots, each of length 2560 chips, where for each slot, the control information includes pilot 3004 to support channel estimation for coherent detection, transmit power control (TPC) 3008, and a transport format combination indicator (TFCI) 3006. The pilots 3004 may be conveyed by a base station and received by a terminal or conveyed by a terminal and received by a base station during communication in a cellular wireless network, or from a terminal to another terminal during communication in an ad hoc network. Further, pilots 3004 may include binary or complex symbols which may be a portion of a length-N code sequence (with N a positive integer) typically known to the receiver. The TFCI 3006 informs the receiver about the instantaneous transport format combination of the transport channels mapped to the simultaneously transmitted uplink DPDCH radio frame.

The relative power offsets for the different control information bits are also shown in FIG. 3. The power offsets $PO1_{dB}$, $PO2_{dB}$, and $PO3_{dB}$ are calculated relative to the transmit power of the data channel DPDCH 3002. That is, the TFCI power offset $PO1_{dB}$, the TPC power offset $PO2_{dB}$ and Pilot power offset $PO3_{dB}$, are generated relative to the transmit power for data channels DPDCH 3002. Conventionally, these offsets are set to a positive value so that the transmit control symbols are transmitted at a higher level than the data symbols, and hence the total transmit power is reduced.

In some aspects, not all DPDCH bits in the frame are transmitted at every TTI. For example, depending on the TFCI, only certain bits are transmitted (e.g., have associated signal components with Additive White Gaussian noise (AWGN)) and the remaining bits are discontinuous transmission (DTx) or muted (e.g., contain only noise components).

Accordingly, in some aspect, second classifier determiner component 1018 may determine noise power 1022 from a DPDCH transmission by first estimating signal power 1020 at different observation periods. For example, the total received power may be generated at UE 1002. Generally, in a wireless channel, the total received power is subject to AWGN, and the total received power is a combination of the signal power and the noise power. An accumulation may be performed over the number of symbols in a received frame to generate the total received power.

The transmit signal power estimate for each channel may also be generated at the UE, where different control information bits within a frame slot have different power offsets, and the power offsets are generally calculated relative to the transmit power of the data channel DPDCH. For example, at an instant i, the total observed signal power from received DPDCH transmitted binary phase shift keying (BPSK) symbols $d_1, d_2, d_3 \ldots d_N$, may be defined as:

$$E_S^- = 2 * \left( \frac{1}{N} \sum_{i=1}^{N} |d_i| \right)^2 \quad (1)$$

where a factor of 2 is used since $$\left( \frac{1}{N} \sum_{i=1}^{N} |d_i| \right)^2$$

defines the estimated total power for a quadrature phase shift keying (QPSK) symbol.

Subsequently, the estimated noise power is generated for each channel by subtracting the signal power estimate from the total power. The resultant noise power estimate is dependent upon, among other things, the modulation scheme (e.g., QPSK, BPSK, etc.) and the despreading code. For example, the estimated noise power may be:

$$Ne_{Tx} = 2M_2 - \overline{E_S^-} \quad (2)$$

$$M_2 = \frac{1}{N} \sum_{i=1}^{N} |d_i|^2 \quad (3)$$

In some aspects, the estimated noise power may be improved by using an un-biasing function. For example, an un-biasing function is applied to the estimated noise power to normalize the noise power at each channel in accordance with the modulation scheme used at the channel. Depending on the modulation scheme used in the channel, the un-biasing function serves to normalize the noise power estimate into a common measure of noise across various different channels. For example, the un-biasing function may be:

$$\gamma = \frac{\overline{E_S^-}}{Ne_{Tx}} \quad (4)$$

where if $\gamma<2$, $\gamma$ is set equal to 2. A biasing coefficient b may then be defined as:

$$b = A_1 * \exp(\lambda_1 * (\gamma-2)) + A_2 * \exp(\lambda_2 * (\gamma-2)) + A_3 * \exp(\lambda_3 * (\gamma-2)) \quad (5)$$

where, in one example, $A_1 = 0.2015$, $\lambda_1 = -20.8503$, $A_2 = 0.5310$, $\lambda_2 = -1.6339$, $A_3 = -3.9259 * 10^{-4}$, and $\lambda_3 = -0.43$. After applying the un-biasing function, the noise power estimate is:

$$\widehat{NE_{Tx}} = 2M_2 - \widehat{E_S^-} \quad (6)$$

$$\widehat{E_S^-} = \frac{\overline{E_S^-}}{(b+1)} \quad (7)$$

$$M_2 = E[|d|^2] = \frac{1}{N} \sum_{i=1}^{N} |d_i|^2 \quad (8)$$

where $M_2$ is the second order moment defined in equation (8), and equation (7) corresponds to an adjusting bias in the expected signal energy $\overline{E_S}$, that is, the signal energy calculated above may not converge to the actual signal energy, and a suitable bias term may accordingly be used.

In some aspects, the noise power estimates from various channels are then combined by weighing the estimates by a scaling factor which may be a function of the number of bits transmitted in those channels. In one aspect, the scaling factor is proportionate to the number of bits that is the contribution of each channel to the overall noise power estimate. The scaling factor may include scaling constants so that a proportionate representation of contribution to the estimated noise power may be incorporated into the total noise power estimate. The UE combines the scaled noise power estimate across various received channels to generate the total estimated noise power. For example, the noise power estimates may be combined as:

$$\widehat{N_e} = \alpha_{TX} Ne_{TX} + \alpha_{DTX} Ne_{DTX} + \alpha_{TPC} Ne_{TPC} + \alpha_{TFCI} Ne_{TFCI} + \alpha_{CPICH} Ne_{CPICH} \quad (9)$$

$$\alpha_{TX} + \alpha_{DTX} + \alpha_{TPC} + \alpha_{TFCI} + \alpha_{CPICH} = 1 \quad (10)$$

where NeTX, eDTX, NeTPC, NeTFCI, NeCPICH are the noise power estimates from DPDCH Tx, DPDCH DTx, TPC, TFCI and CPICH bits, respectively, and $\alpha_{TX}$, $\alpha_{DTX}$, $\alpha_{TPC}$, $\alpha_{TFCI}$, $\alpha_{CPICH}$ are scaling constants used to scale the noise power estimates from DPDCH Tx, DPDCH DTx, TPC, TFCI and CPICH bits, respectively.

Therefore, according to one or more aspects of the present disclosure, a low complexity method is disclosed to generate the estimated noise power by utilizing the signal power across several channels. These aspects have been presented with reference to the dedicated physical channel. However, as those skilled in the art will readily appreciate, the noise power estimate may be extended to other downlink transmission channels. Such channels can include the dedicated channel (DCH), the broadcast channel (BCH), the paging channel (PCH), the random access channel (RACH), and the downlink shared channel (DSCH).

Figure 4:
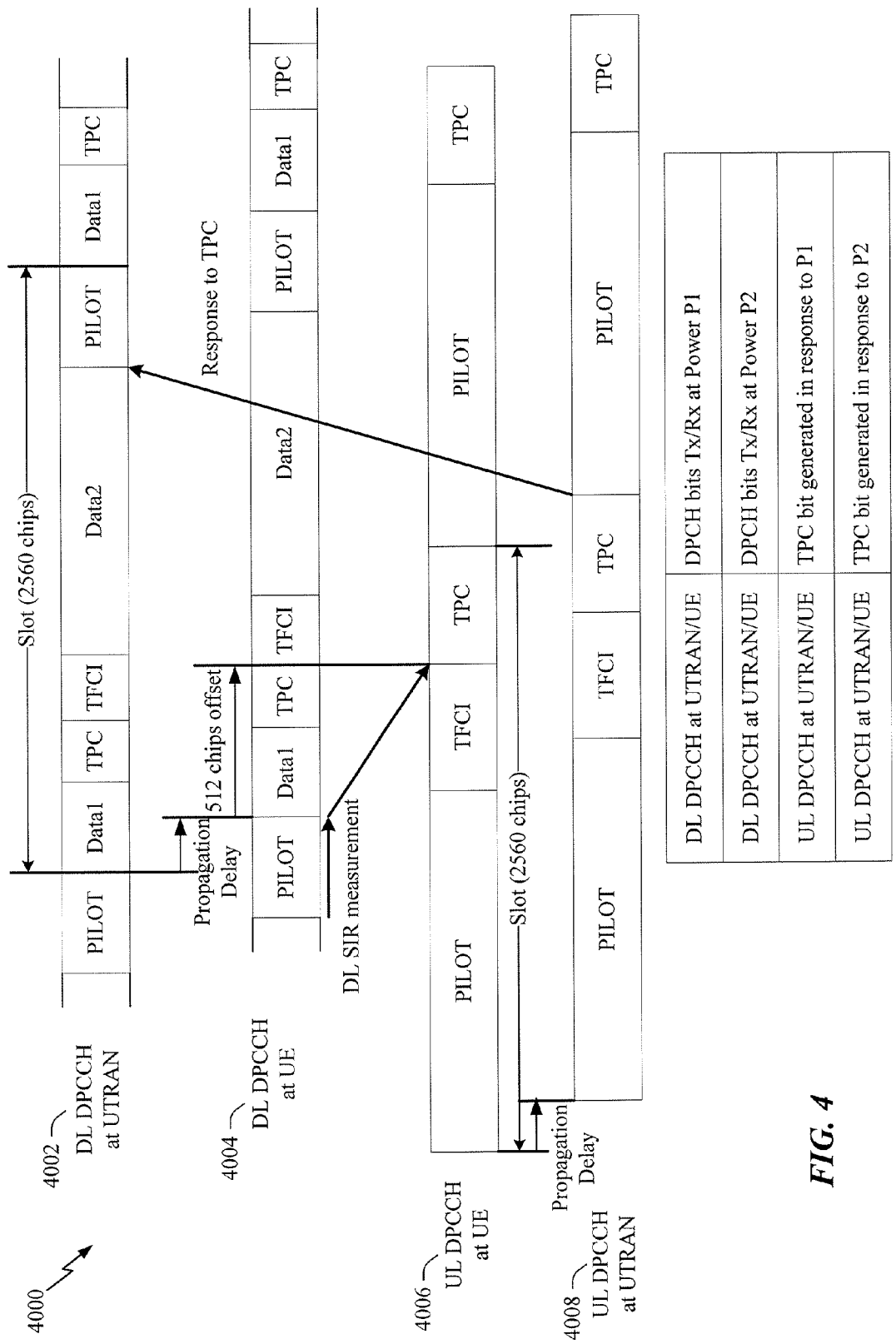
FIG. 4 is a schematic diagram illustrating an example power control timeline in aspects of the system of FIG. 1.

Some present aspects provide improved signal power estimation at UE 1002. An example power control timeline 4000 for a dedicated physical channel (DPCH) power control update cycle is provided in FIG. 4. The power control timeline 4000 may be partitioned into blocks with predetermined durations. For example, at block 4006, the UE prepares a DPCCH frame that includes TPC commands, TFCI commands, and pilot signal bits. The uplink DPCCH frame is split into slots of length 2560 chips. After some propagation delay, the uplink DPCCH frame is received at the UTRAN at block 4008. Concurrently, at block 4002, the UTRAN prepares a downlink DPCCH frame that includes pilot signal bits, data bits of the DPDCH, TFCI commands, and TPC commands. The downlink DPCCH frame is split into slots of length 2560 chips. After some propagation delay, at block 4004, the downlink DPCCH frame is received at the UE. The power control timeline 4000 shows the iterative nature of wireless transmission power control. For instance, if at block 4002 the downlink DPCCH bits are transmitted at a power P1, and at block 4004 the corresponding downlink DPCCH bits are received at the UE at a power P2, then at block 4006 the TPC control bits are generated in response to the received power P2, that is, the subsequent uplink DPCCH bits at block 4006 are transmission power controlled based on the received power P2. Since the power control updates take place starting at the pilot bits (the last few bits of the slot), the rest of the bits are transmitted at a power that is scaled down by $\Delta_{TPC}$. Therefore, the subsequent power of the dedicated pilot bits, $P_{DP}$, is a scaled down version of the DPCH frame ($P_{DP} = \Delta_{TPC} P_{DPCH/(DP)}$).

Figure 5:
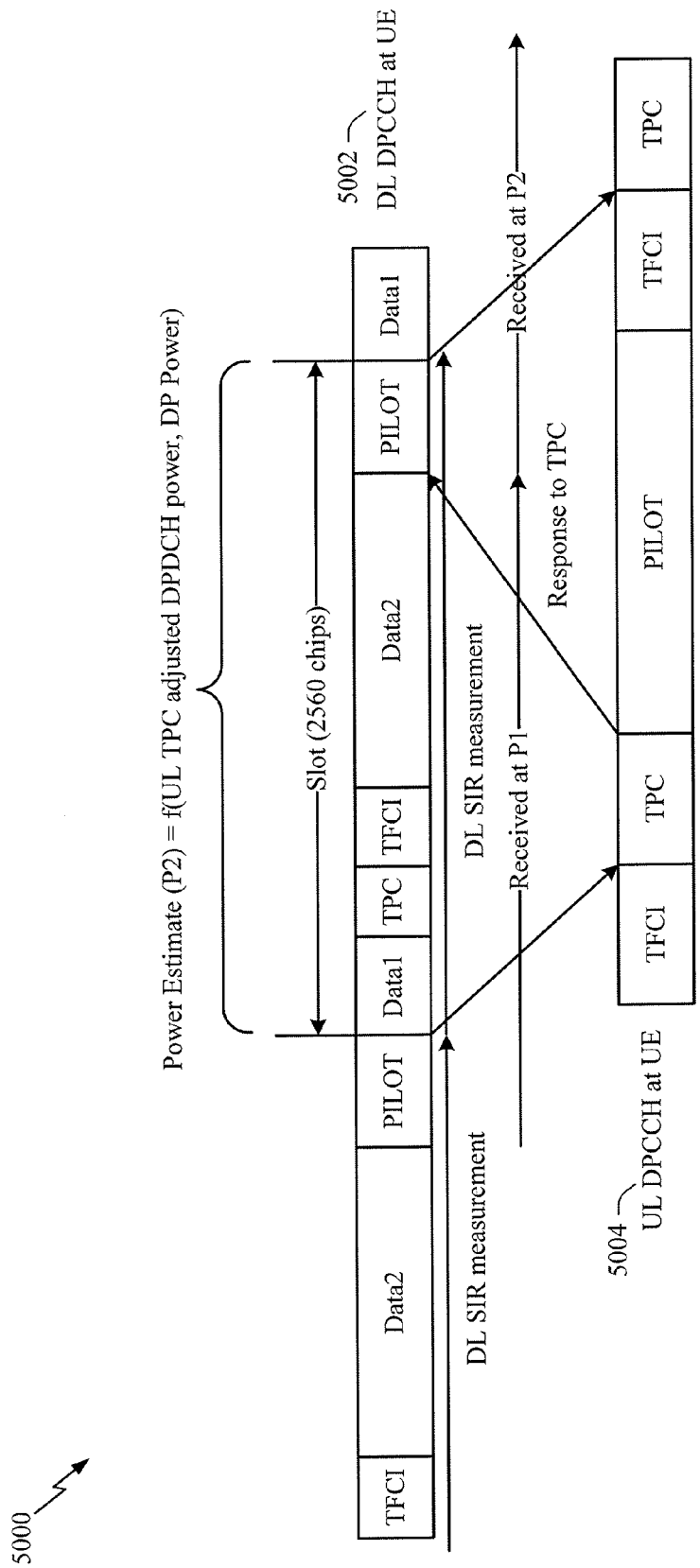
FIG. 5 is a schematic timeline diagram illustrating an example signal power estimation in aspects of the system of FIG. 1.

Referring now to FIG. 5, a schematic timeline diagram for an example signal power estimation 5000 is illustrated in accordance with an aspect of the present disclosure. The signal power in the downlink DPCCH frame 5002 is measured at the UE by a downlink SIR measurement across the bits of the frame. On the uplink, the transmit power of the DPCCH frame 5004 prepared at the UE is adjusted based on the received bits, and the UE-prepared DPCCH frame is then transmitted to UTRAN with the power control that is updated to reflect the received signal power. In an aspect of the disclosure, the UE determines the transmit power of each slot of the DPCCH. The transmit power of each slot may be communicated to the UE through the TPC bits or may be estimated by the UE. Further, the UE determines the power offset $PO1_{dB}$, $PO2_{dB}$, and $PO3_{dB}$ as described herein with reference to FIG. 3. Conventionally, these offsets are set to a positive value so that the transmit control symbols are transmitted at a higher level than the data symbols. The transmit power contribution for each slot is then generated. In one aspect, the transmit power contribution is a simple product of the number of bits, the transmit power, and the power offset for each slot. The transmit power contribution is an approximate measure of the contribution of each slot to the total transmit power of the frame.

The signal power is then estimated by weighing the power estimate obtained by the rest of the DPCH bits by appropriate scaling factor which is a function of the power and the number of bits transmitted. The transmit power contributions may be scaled by a weight which corresponds to the power adjustment applied in the network using the downlink TPC bits. The signal power estimate Pe may be provided by:

$$Pe = \Delta_{TPC} \frac{PO_3 \Delta_{TPC} N_{Pilot} Pe_{Pilot} + PO_2 N_{TPC} Pe_{TPC} + PO_1 N_{TFCI} Pe_{TFCI} + N_{TX} Pe_{TX}}{(PO_3 \Delta_{TPC})^2 N_{Pilot} + PO_2^2 N_{TPC} + PO_1^2 N_{TFCI} + N_{TX}} \quad (11)$$

where $PO_3$ is the power offset between the DP bits and the DPDCH bits in linear scale, $N_{pilot}$ is the number of DP bits transmitted per slot, $Pe_{pilot}$ is the power estimate using the DP bits, $PO_2$ is the power offset between the TPC bits and the DPDCH bits in linear scale, $N_{TPC}$ is the number of TPC bits transmitted per slot, $Pe_{TPC}$ is the power estimate using the TPC bits, $PO_1$ is the power offset between the TFCI bits and the DPDCH bits in linear scale, $N_{TFCI}$ is the number of TFCI bits transmitted per slot, $Pe_{TFCI}$ is the power estimate using the TFCI bits, $Pe_{TX}$ is the power estimate using the transmitted data (DPDCH) bits, $N_{TX}$ is the number of transmitted DPDCH bits per slot, and $\Delta_{TPC}$ is the power adjustment applied at the network using the DL TPC bit.

Generally, the power adjustment $\Delta TPC$ is signaled to the UE by UTRAN. In an alternative aspect of the disclosure, if $\Delta TPC$ is not signaled to the UE by UTRAN, $\Delta TPC$ may be generated at the UE by power averaging. Similarly, the power offsets PO1, PO2, or PO3, may be signaled to the UE by UTRAN. In an alternative aspect of the disclosure, the power offsets PO1, PO2, or PO3 may be estimated at the UE.

In some aspects, for example, in soft handover (multiple wireless links), the UE may compute the DPDCH and the DP power on per link basis (i.e. per DL DPCH link) and later combine the estimates to generate the estimated signal power.

Therefore, according to one or more aspects of the present disclosure, a low complexity method is disclosed to generate the estimated signal power by utilizing all of the transmitted bits in the DPCCH frame, rather than just through the dedicated pilots. These aspects have been presented with reference to the dedicated physical channel. However, as those skilled in the art will readily appreciate, the signal power estimate may be extended to other downlink transmission channels. Such channels can include DCH, BCH, PCH, RACH, and DSCH.

Referring to FIGS. 6-9, in some aspects, methods 6000-9000 for wireless communication are illustrated. For explanatory purposes, methods 6000-9000 will be discussed with reference to the above described FIG. 1. It should be understood that in other implementations, other systems and/or UEs, Node Bs, or other apparatus comprising different components than those illustrated in FIG. 1 may be used in implementing methods 6000-9000 of FIGS. 6-9.

Figure 6:
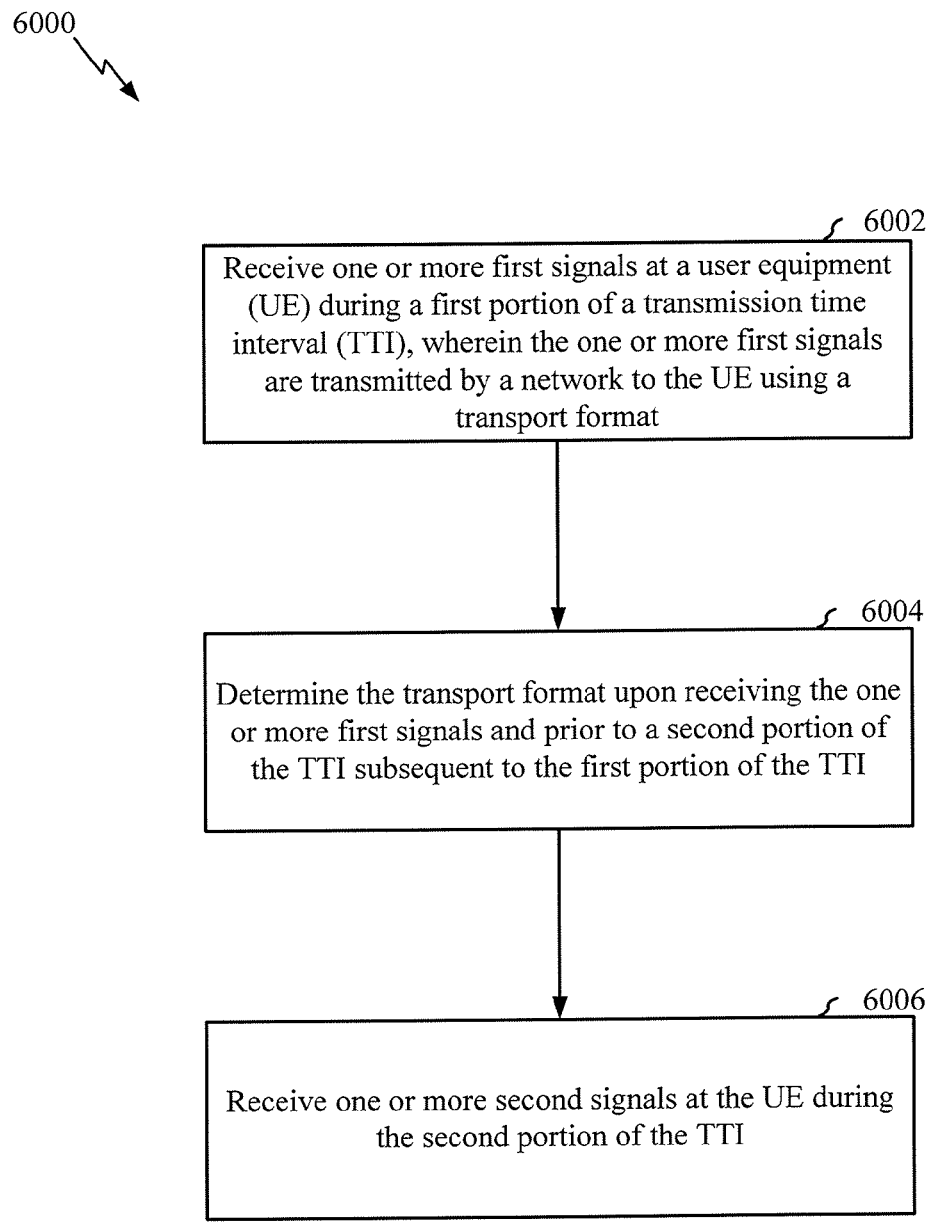
FIGS. 6-9 are flowcharts of methods in aspects of the system of FIG. 1.

Referring now to FIG. 6, at block 6002, method 6000 includes receiving one or more first signals at a user equipment (UE) during a first portion of a transmission time interval (TTI), wherein the one or more first signals are transmitted by a network to the UE using a transport format. For example, UE 1002 may receive one or more first signals transmitted from Node B 1004 during a TTI using a transport format.

At block 6004, method 6000 includes determining the transport format upon receiving the one or more first signals and prior to a second portion of the TTI subsequent to the first portion of the TTI. For example, transport format determiner component 1006 of UE 1002 may determine the transport format upon receiving the one or more first signals and prior to a second portion of the TTI subsequent to the first portion of the TTI, e.g., determine a transport format used by the network during a TTI and before signal transmissions during the TTI are received in their entirety. In some aspects, transport format determiner component 1006 may determine the transport format based on information on transport format patterns that the network uses during at least one of VA modes and SA modes, where the packet types may be a FR, SID, or NULL packet. In some aspects, transport format determiner component 1006 may determine the transport format based on previously determined transport formats of previous TTIs at UE 1002. In some aspects, transport format determiner component 1006 may determine the transport format based on one or more CRCs on decoded data at UE 1002 and a current mode of UE 1002, where the current mode of UE 1002 is a VA or SA mode. In some aspects, the CRC may be determined by CRC determiner component 1014.

In some aspects, upon determining the CRC, UE 1002 may maintain its current mode when the CRC has failed, transition to a complementary mode of the current mode when the CRC has passed and the transport format corresponds to the complementary mode, or transition to a complementary mode of the current mode when the CRC has passed and the transport format is a transition transport format.

At block 6006, method 6000 includes receiving one or more second signals at the UE during the second portion of the TTI. For example, UE 1002 may receive one or more second signals transmitted from Node B 1004 during the second portion of the TTI subsequent to the first portion of the TTI.

Figure 7:
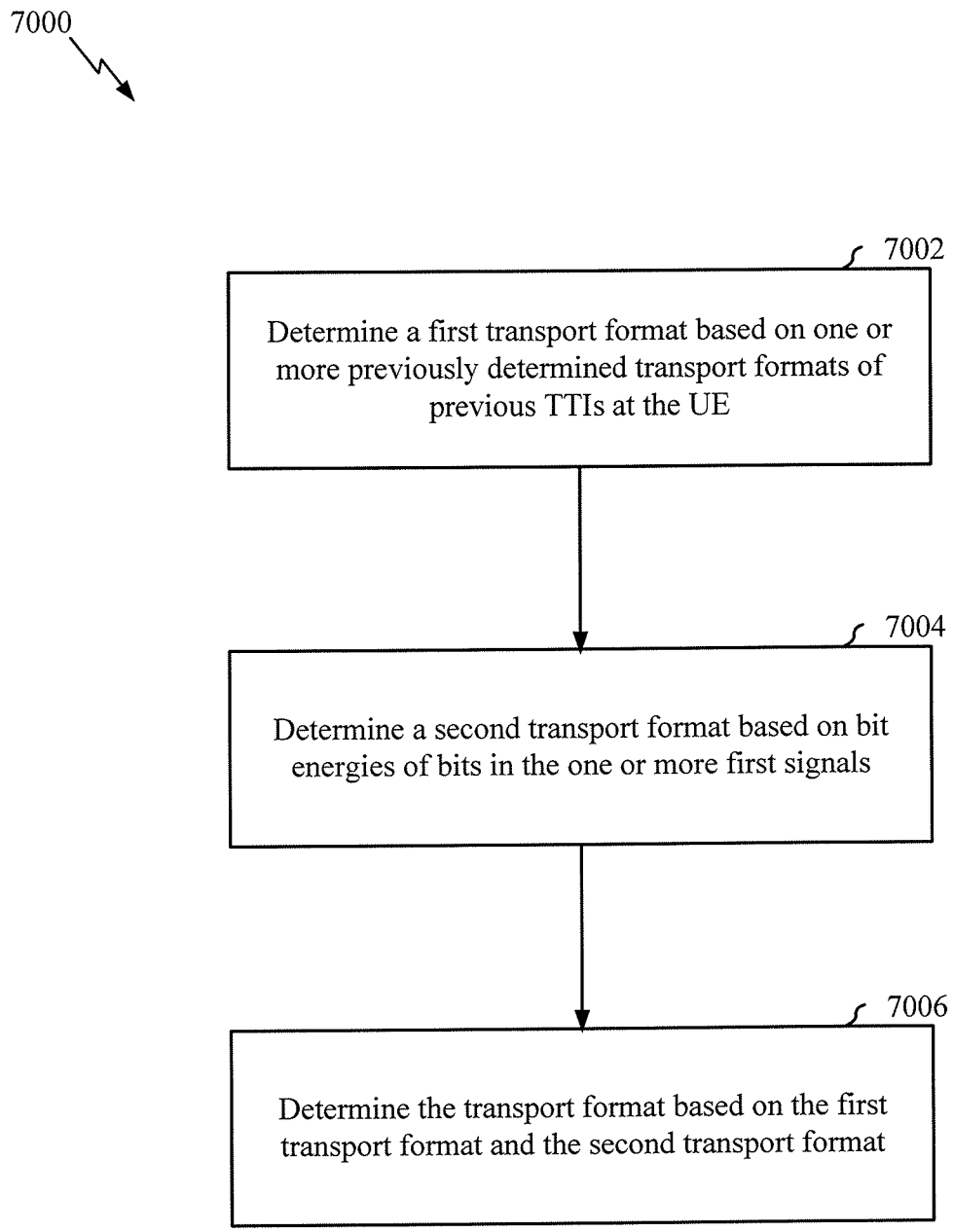

Referring now to FIG. 7, method 7000 for determining the transport format used by the network during the TTI is illustrated. In some aspects, method 7000 may include alternative, additional, or optional aspects of block 6004 of method 6000 described herein with reference to FIG. 6.

At block 7002, method 7000 includes determining a first transport format based on previously determined transport formats of previous TTIs at the UE. For example, transport format determiner component 1006 of UE 1002 may determine a first transport format based on previously determined transport formats of previous TTIs at UE 1002. For example, transport format determiner component 1006 may include first classifier determiner component 1016 that determines the first transport format based on information on transport format patterns that the network uses during VA and SA modes, where the packet types may be FR, SID, or NULL. In some aspects, first classifier determiner component 1016 may determine the first transport format based on a CRC on decoded data at UE 1002 and a current mode of UE 1002 that may be a VA or a SA mode.

At block 7004, method 7000 includes determining a second transport format based on bit energies of bits in the one or more first signals. For example, second classifier determiner component 1018 may determine a second transport format based on bit energies of bits in the one or more first signals. In some aspects, where bit positions that are used to transmit the transport format are fixed, second classifier determiner component 1018 may determine a second transport format by comparing the bit energies with a threshold value. In some aspects, second classifier determiner component 1018 may determine a second transport format by determining an estimated signal power at UE 1002.

At block 7006, method 7000 includes determining the transport format based on the first transport format and the second transport format. For example, transport format determiner component 1006 may determine the transport format based on the first transport format and the second transport format. In some aspects, the transport format corresponds to the second transport format when the first transport format and the second transport format are different and the second transport format is a transition transport format. In some aspects, the transport format corresponds to the first transport format when the first transport format and the second transport format are different and the second transport format is not a transition transport format.

In some aspects, transport format determiner component 1006 may determine the transport format based on the first transport format and the second transport format by assigning weights to the first transport format and the second transport format based on an application type.

Figure 8:
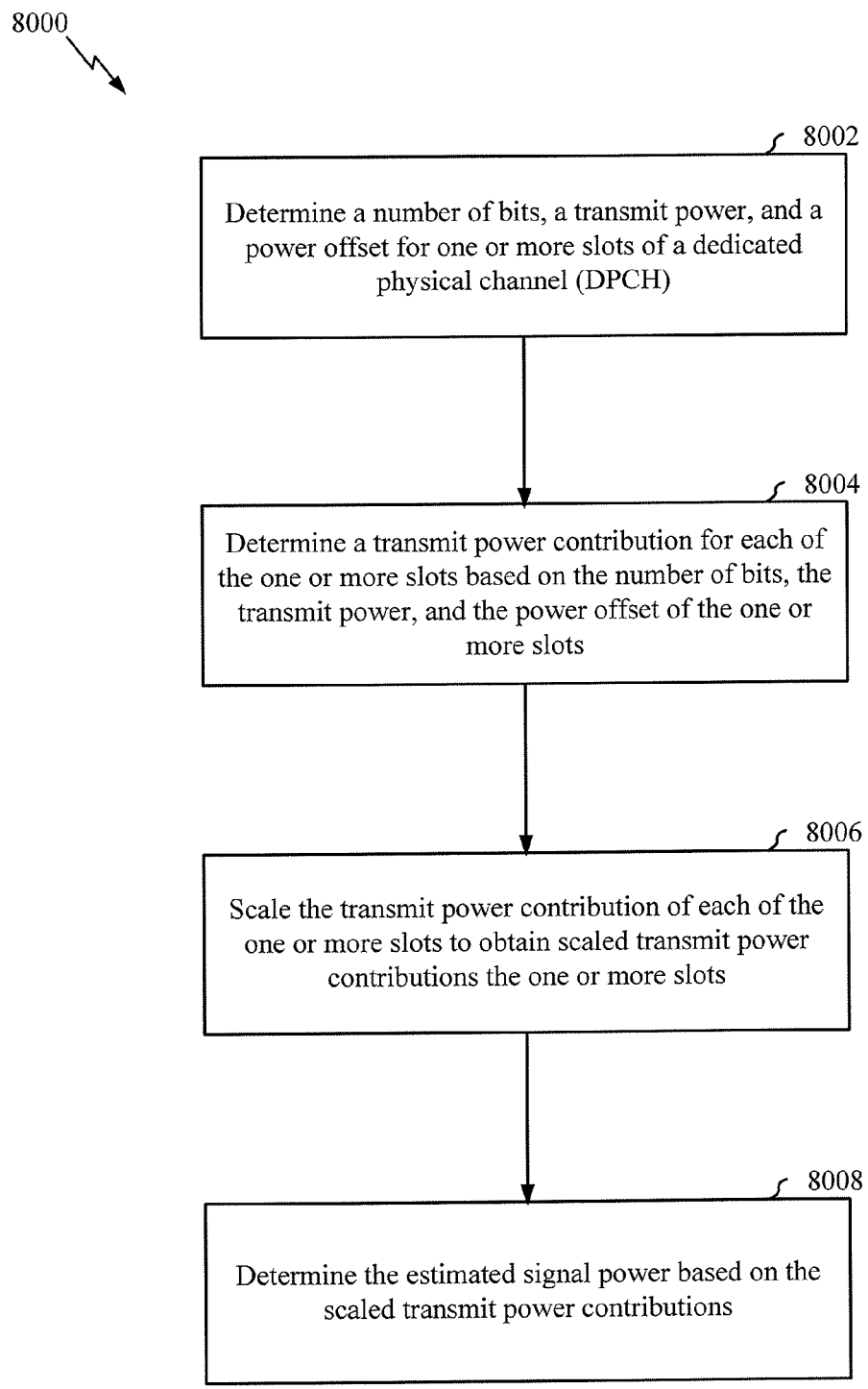

Referring now to FIG. 8, method 8000 for determining an estimated signal power at a UE is illustrated. In some aspects, method 8000 may include alternative, additional, or optional aspects of block 7004 of method 7000 described herein with reference to FIG. 7.

At block 8002, method 8000 includes determining a number of bits, a transmit power, and a power offset for one or more slots of a DPCH. For example, second classifier determiner component 1018 of UE 1002 may determine a number of bits, a transmit power, and a power offset for one or more slots of a DPCH. In some aspects, second classifier determiner component 1018 may determine the power offset based on TPC bits. In some aspects, the DPCH is a PDCCH. In some aspects, the slots include one or more of DP bits, TPC bits, and TFCI bits.

At block 8004, method 8000 includes determining a transmit power contribution for each of the one or more slots based on the number of bits, the transmit power, and the power offset of the one or more slots. For example, second classifier determiner component 1018 may determine a transmit power contribution for one or more slots based on the number of bits, the transmit power, and the power offset of the slots. In some aspects, the transmit power contribution of a slot is a product of the number of bits, the transmit power, and the power offset of the slot.

At block 8006, method 8000 includes scaling the transmit power contribution of each of the one or more slots to obtain scaled transmit power contributions of the one or more slots. For example, second classifier determiner component 1018 may scale the transmit power contribution of each of the slots to obtain scaled transmit power contributions of the slots. In some aspects, scaling the transmit power contribution is based on a power adjustment in downlink TPC bits.

At block 8008, method 8000 includes determining the estimated signal power based on the scaled transmit power contributions. For example, second classifier determiner component 1018 may determine the estimated signal power based on the scaled transmit power contributions of the slots.

In some aspects, second classifier determiner component 1018 may further determine a power adjustment based on TPC bits and adjust the estimated signal power by the power adjustment.

Figure 9:
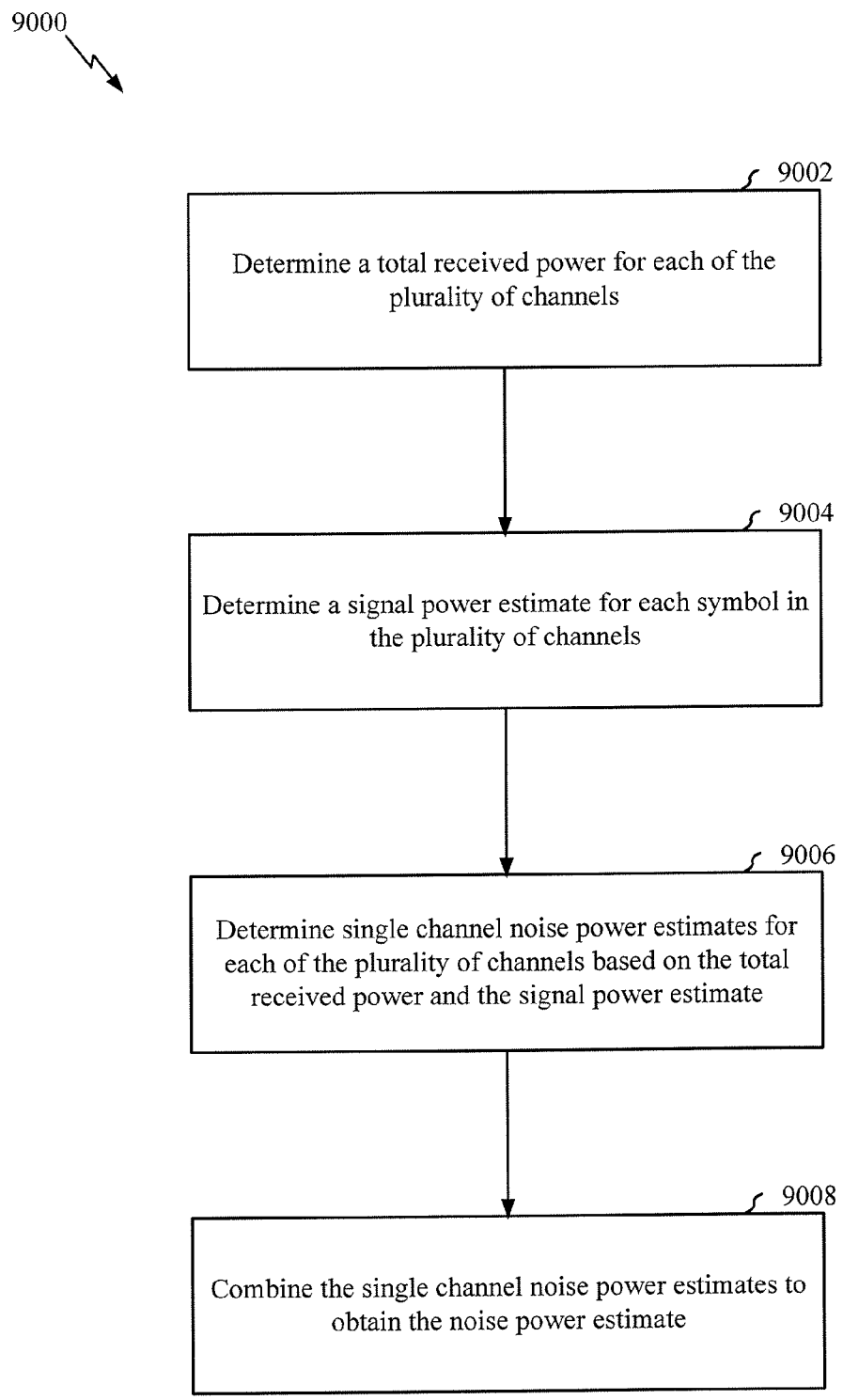

Referring now to FIG. 9, method 9000 for determining bit energies based on a noise power estimate corresponding to a plurality of channels transmitting at least one symbol or no symbols is illustrated. In some aspects, method 9000 may include alternative, additional, or optional aspects of block 7004 of method 7000 described herein with reference to FIG. 7.

At block 9002, method 9000 includes determining a total received power for each of the plurality of channels. For example, second classifier determiner component 1018 of UE 1002 may determine a total received power for each of the plurality of channels. In some aspects, the channels may include DPCH, P-CCPR, or SCH, or a channel that employs an OVSF code with a spreading factor of 256.

At block 9004, method 9000 includes determining a signal power estimate for each symbol in the plurality of channels. For example, second classifier determiner component 1018 may determine a signal power estimate for each symbol in the channels.

At block 9004, method 9000 includes determining single channel noise power estimates for each of the plurality of channels based on the total received power and the signal power estimate. For example, second classifier determiner component 1018 may determine single channel noise power estimates for each of the plurality of channels based on the total received power and the signal power estimate.

At block 9004, method 9000 includes combining the single channel noise power estimates to obtain the noise power estimate. For example, second classifier determiner component 1018 may combine the single channel noise power estimates to obtain the noise power estimate. In some aspects, second classifier determiner component 1018 may combine the single channel noise power estimates by applying an unbiasing function to the single channel noise power estimates to obtain unbiased noise power estimates, applying a scaling factor to each of the unbiased noise power estimates to obtain scaled noise power estimates, and combining the scaled noise power estimates of the plurality of channels to obtain the noise power estimate. In some aspects, where the scaling factor is a function of the number of bits transmitted in a respective channel. For example, the scaling factor may be proportionate to the number of bits. In some aspects, applying the unbiasing function results in unbiased noise power estimates that are normalized based on modulation schemes used at corresponding channels.

Figure 10:
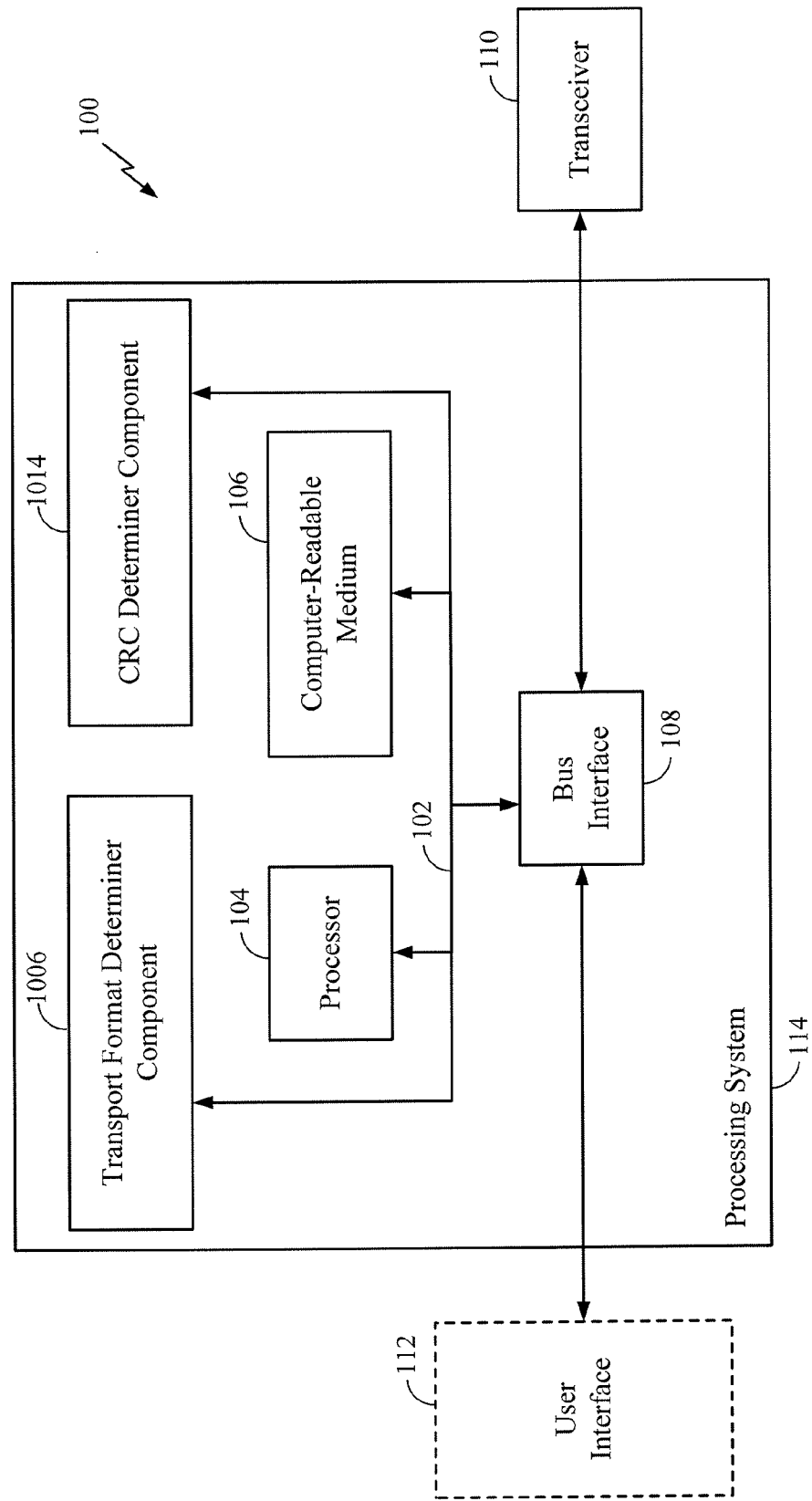
FIG. 10 is a block diagram illustrating an example of a hardware implementation for an apparatus of FIG. 1 employing a processing system.

FIG. 10 is a block diagram illustrating an example of a hardware implementation for an apparatus 100 employing a processing system 114 to operate, for example, UE 1002, Node B 1004, transport format determiner component 1006, CRC determiner component 1014, and/or respective components thereof (see FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided. Apparatus 100 further includes transport format determiner component 1006 and CRC determiner component 1014 (see FIG. 1) that are linked by bus 102 to other components of apparatus 100.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. In some aspects, at least some of the functions or features supported by transport format determiner component 1006 may be implemented, performed, or executed by the processor 104 in connection with the computer-readable medium 106.

Figure 11:
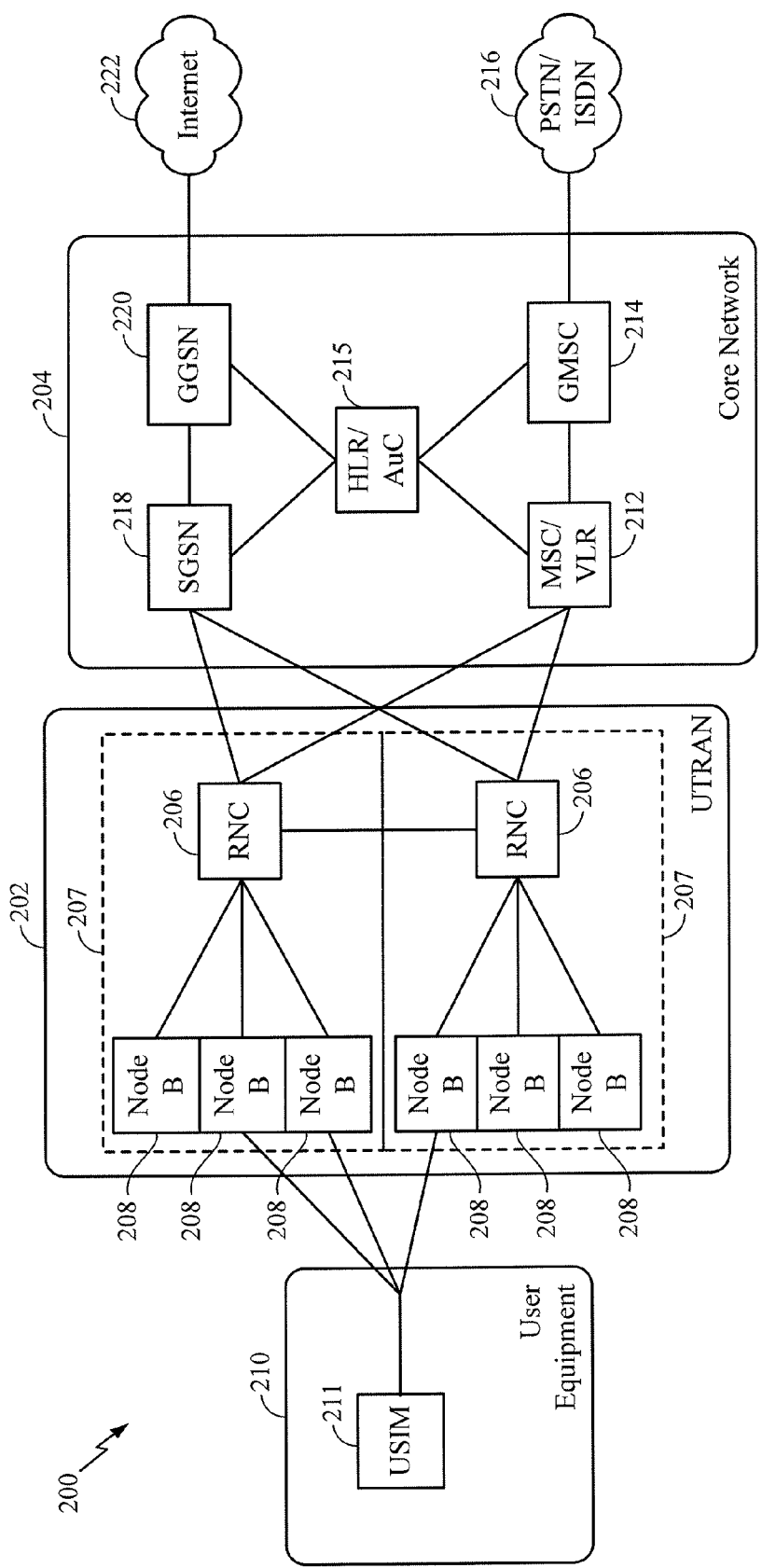
FIG. 11 is a block diagram conceptually illustrating an example of a telecommunications system including aspects of the system of FIG. 1.

The various concepts presented throughout this disclosure may be implemented across a broad variety of telecommunication systems, network architectures, and communication standards. By way of example and without limitation, the aspects of the present disclosure illustrated in FIG. 11 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 or UTRAN 202 may include UE 1002, Node B 1004, transport format determiner component 1006, CRC determiner component 1014, or apparatus 100 (see FIGS. 1 and 10). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 12:
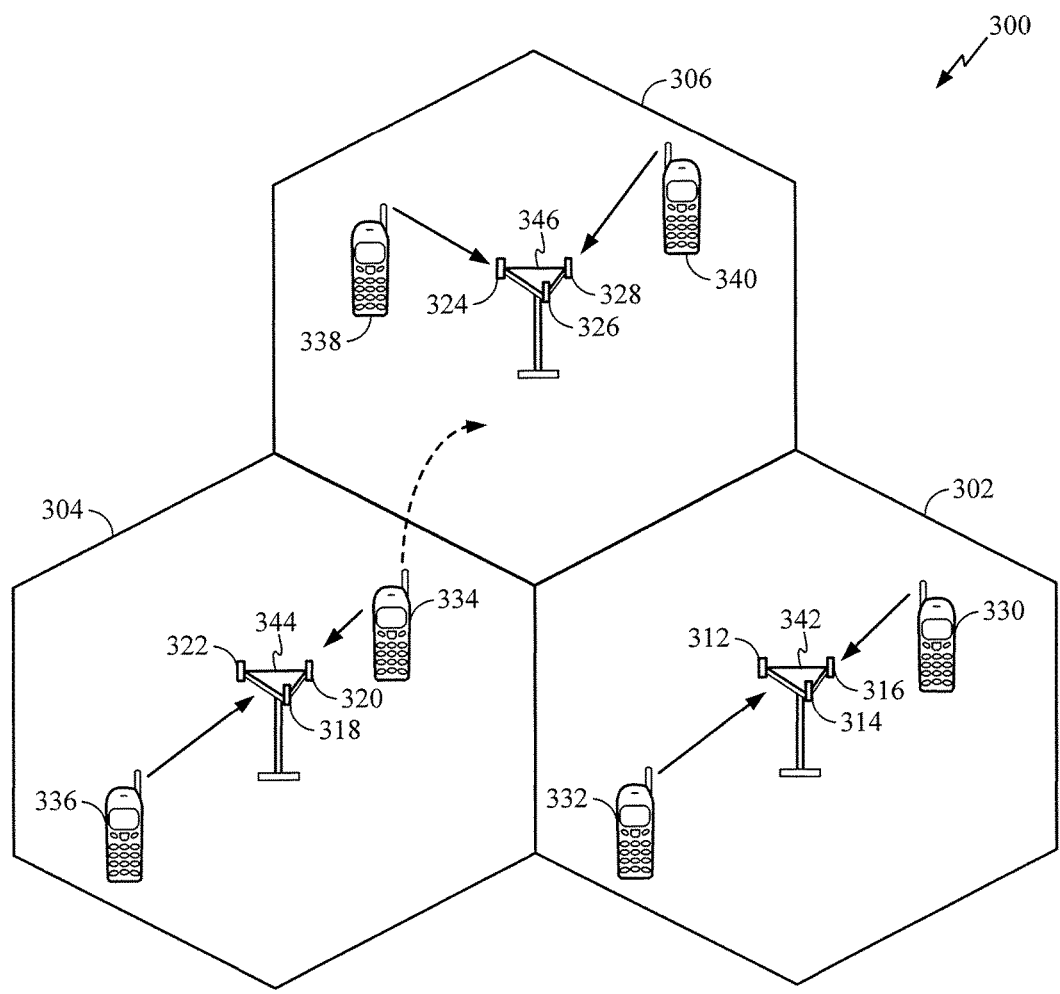
FIG. 12 is a conceptual diagram illustrating an example of an access network including aspects of the system of FIG. 1.

Referring to FIG. 12, an access network 300 in a UTRAN architecture is illustrated in which one or more of the wireless communication entities, e.g., UEs and/or base stations, may include UE 1002, 210, Node B 1004, 208, transport format determiner component 1006, CRC determiner component 1014, or apparatus 100 (see FIGS. 1, 10, and 11). The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 11) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 11), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 13.

Figure 13:
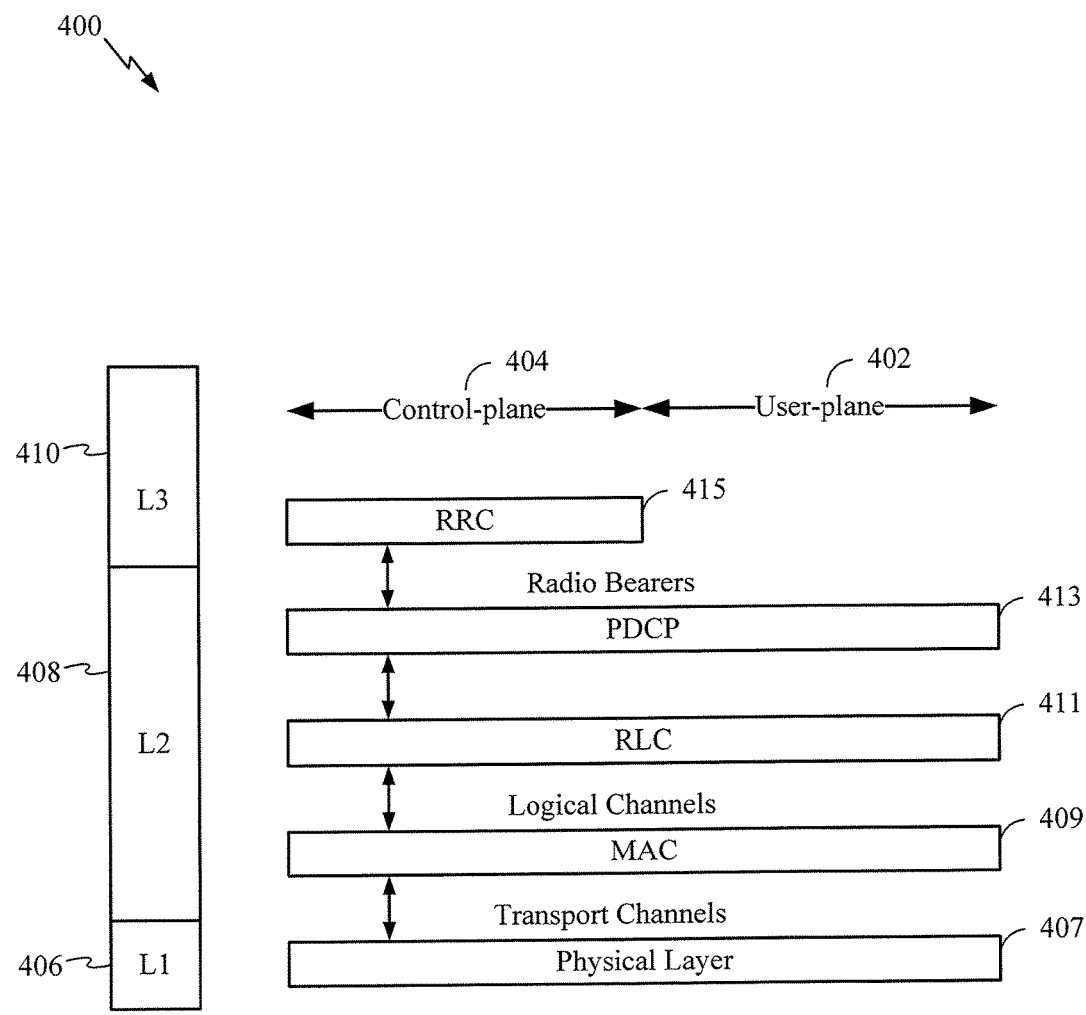
FIG. 13 is a conceptual diagram illustrating an example of a radio protocol architecture for the user and control planes in aspects of the system of FIG. 1.

Referring to FIG. 13 an example radio protocol architecture 400 relates to the user plane 402 and the control plane 404 of a user equipment (UE) or node B/base station. For example, architecture 400 may be included in UE 1002, 210, Node B 1004, 208, or apparatus 100 (see FIGS. 1, 10, and 11). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 14:
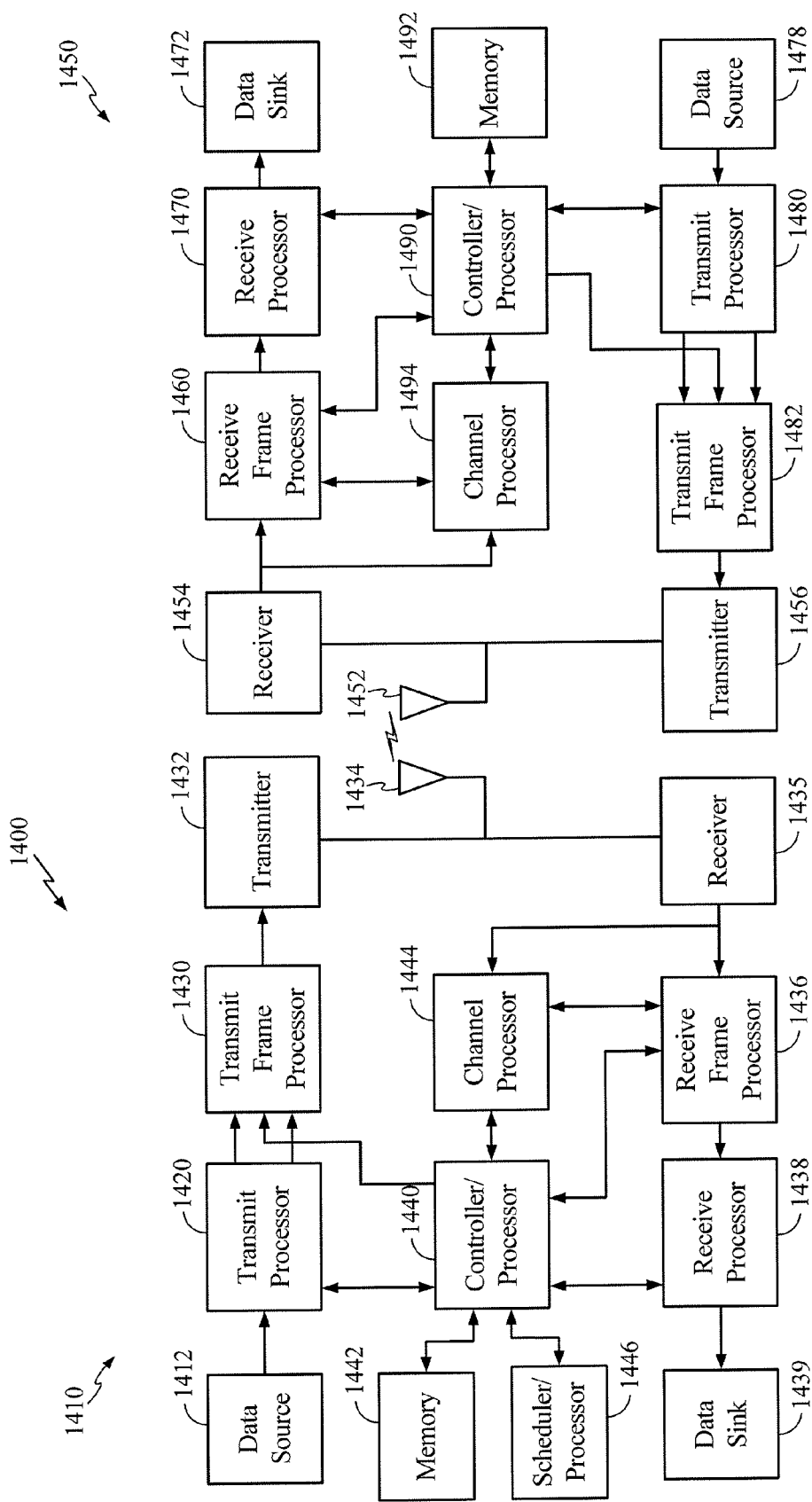
FIG. 14 is a block diagram conceptually illustrating an example of a Node B in communication with a UE in a telecommunications system, including aspects of the system of FIG. 1.

FIG. 14 is a block diagram of a Node B 1410 in communication with a UE 1450, where the Node B 1410 the UE 1450 may include UE 1002, 210, Node B 1004, 208, transport format determiner component 1006, CRC determiner component 1014, or apparatus 100 (see FIGS. 1, 10, and 11). In the downlink communication, a transmit processor 1420 may receive data from a data source 1412 and control signals from a controller/processor 1440. The transmit processor 1420 provides various signal processing functions for the data and control signals, as well as reference signals (e.g., pilot signals). For example, the transmit processor 1420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1444 may be used by a controller/processor 1440 to determine the coding, modulation, spreading, and/or scrambling schemes for the transmit processor 1420. These channel estimates may be derived from a reference signal transmitted by the UE 1450 or from feedback from the UE 1450. The symbols generated by the transmit processor 1420 are provided to a transmit frame processor 1430 to create a frame structure. The transmit frame processor 1430 creates this frame structure by multiplexing the symbols with information from the controller/processor 1440, resulting in a series of frames. The frames are then provided to a transmitter 1432, which provides various signal conditioning functions including amplifying, filtering, and modulating the frames onto a carrier for downlink transmission over the wireless medium through antenna 1434. The antenna 1434 may include one or more antennas, for example, including beam steering bidirectional adaptive antenna arrays or other similar beam technologies.

At the UE 1450, a receiver 1454 receives the downlink transmission through an antenna 1452 and processes the transmission to recover the information modulated onto the carrier. The information recovered by the receiver 1454 is provided to a receive frame processor 1460, which parses each frame, and provides information from the frames to a channel processor 1494 and the data, control, and reference signals to a receive processor 1470. The receive processor 1470 then performs the inverse of the processing performed by the transmit processor 1420 in the Node B 1410. More specifically, the receive processor 1470 descrambles and despreads the symbols, and then determines the most likely signal constellation points transmitted by the Node B 1410 based on the modulation scheme. These soft decisions may be based on channel estimates computed by the channel processor 1494. The soft decisions are then decoded and deinterleaved to recover the data, control, and reference signals. The CRC codes are then checked to determine whether the frames were successfully decoded. The data carried by the successfully decoded frames will then be provided to a data sink 1472, which represents applications running in the UE 1450 and/or various user interfaces (e.g., display). Control signals carried by successfully decoded frames will be provided to a controller/processor 1490. When frames are unsuccessfully decoded by the receiver processor 1470, the controller/processor 1490 may also use an acknowledgement (ACK) and/or negative acknowledgement (NACK) protocol to support retransmission requests for those frames.

In the uplink, data from a data source 1478 and control signals from the controller/processor 1490 are provided to a transmit processor 1480. The data source 1478 may represent applications running in the UE 1450 and various user interfaces (e.g., keyboard). Similar to the functionality described in connection with the downlink transmission by the Node B 1410, the transmit processor 1480 provides various signal processing functions including CRC codes, coding and interleaving to facilitate FEC, mapping to signal constellations, spreading with OVSFs, and scrambling to produce a series of symbols. Channel estimates, derived by the channel processor 1494 from a reference signal transmitted by the Node B 1410 or from feedback contained in the midamble transmitted by the Node B 1410, may be used to select the appropriate coding, modulation, spreading, and/or scrambling schemes. The symbols produced by the transmit processor 1480 will be provided to a transmit frame processor 1482 to create a frame structure. The transmit frame processor 1482 creates this frame structure by multiplexing the symbols with information from the controller/processor 1490, resulting in a series of frames. The frames are then provided to a transmitter 1456, which provides various signal conditioning functions including amplification, filtering, and modulating the frames onto a carrier for uplink transmission over the wireless medium through the antenna 1452.

The uplink transmission is processed at the Node B 1410 in a manner similar to that described in connection with the receiver function at the UE 1450. A receiver 1435 receives the uplink transmission through the antenna 1434 and processes the transmission to recover the information modulated onto the carrier. The information recovered by the receiver 1435 is provided to a receive frame processor 1436, which parses each frame, and provides information from the frames to the channel processor 1444 and the data, control, and reference signals to a receive processor 1438. The receive processor 1438 performs the inverse of the processing performed by the transmit processor 1480 in the UE 1450. The data and control signals carried by the successfully decoded frames may then be provided to a data sink 1439 and the controller/processor, respectively. If some of the frames were unsuccessfully decoded by the receive processor, the controller/processor 1440 may also use an acknowledgement (ACK) and/or negative acknowledgement (NACK) protocol to support retransmission requests for those frames.

The controller/processors 1440 and 1490 may be used to direct the operation at the Node B 1410 and the UE 1450, respectively. For example, the controller/processors 1440 and 1490 may provide various functions including timing, peripheral interfaces, voltage regulation, power management, and other control functions. The computer readable media of memories 1442 and 1492 may store data and software for the Node B 1410 and the UE 1450, respectively. A scheduler/processor 1446 at the Node B 1410 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving one or more first signals at a user equipment (UE) during a first portion of a current transmission time interval (TTI), wherein the one or more first signals are transmitted by a network to the UE using a transport format of multiple transport formats;
   determining, based on information of one or more previous TTIs received by the UE and based on bit energies of bits in the one or more first signals, the transport format upon receiving the one or more first signals and prior to a second portion of the current TTI subsequent to the first portion of the current TTI, the position of the bits in each of the multiple transport formats being fixed and the bit energies of the bits having different values depending on the transport format; and performing one or more operations at the UE during the second portion of the current TTI based on the determined transport format.

2. The method of claim 1, wherein the determining of the transport format is based on information regarding transport format patterns that the network uses for communicating with the UE during at least one of a voice activity (VA) mode or a silent activity (SA) mode, wherein the first signals comprise packet types that include at least one of a full rate (FR) packet, a silent insertion descriptor (SID) packet, or a NULL packet.

3. The method of claim 1, wherein the determining of the transport format is based on a previously determined transport format of a previous TTI at the UE.

4. The method of claim 1, wherein the determining of the transport format is based on one or more of a cyclic redundancy check (CRC) on decoded data at the UE and a current mode of the UE, wherein the current mode of the UE is one of a voice activity (VA) mode or a silent activity (SA) mode.

5. The method of claim 4, further comprising:
maintaining the current mode when the CRC has failed; and
transitioning from the current mode to a complementary mode of the current mode when the CRC has passed and the transport format corresponds to either the complementary mode or a transition transport format.

6. The method of claim 1, wherein the determining of the transport format comprises:
determining a first transport format based on one or more previously determined transport formats of previous TTIs at the UE;
determining a second transport format based on the bit energies of the bits in the one or more first signals; and
determining the transport format based on the first transport format and the second transport format.

7. The method of claim 6, wherein the determining of the second transport format comprises determining an estimated signal power at the UE by:
determining a number of bits, a power estimate, and a power offset for one or more slots of a dedicated physical channel (DPCH), wherein the number of bits is fixed irrespective of the multiple transport formats, and wherein the power offset is calculated relative to a transmit power of a dedicated physical data channel;
determining a transmit power contribution for each of the one or more slots based on the number of bits, the power estimate, and the power offset of the one or more slots;
scaling the transmit power contribution of each of the one or more slots to obtain scaled transmit power contributions of the one or more slots by a weight corresponding to a power adjustment using downlink transmit power control (TPC) bits; and
determining the estimated signal power based on the scaled transmit power contributions.

8. The method of claim 6, further comprising:
determining the bit energies based on a noise power estimate corresponding to a plurality of channels transmitting at least one symbol or transmitting no symbols, wherein the determining of the bit energies comprises:

determining a total received power for each of the plurality of channels;
determining a signal power estimate for each symbol in the plurality of channels;
determining single channel noise power estimates for each of the plurality of channels based on the total received power and the signal power estimate; and
combining the single channel noise power estimates to obtain the noise power estimate.

9. The method of claim 8, wherein the plurality of channels comprises a dedicated physical channel (DPCH), a primary common connection physical channel (P-CCPH), or a synchronization channel (SCH), or a channel that employs an orthogonal variable spreading factor (OVSF) code with a spreading factor of 256.

10. The method of claim 1, wherein the performing one or more operations at the UE during the second portion of the current TTI includes performing at least one of:
determining a termination of a frame based on the determined transport format;
determining whether a dedicated physical data channel (DPDCH) requires demodulation at the UE based on the determined transport format;
adjusting a level of interference that can be allowed on calls of other transmission/reception technologies based on the determined transport format;
detecting a dedicated control channel (DCCH) based on the determined transport format; or
detecting a presence of a false cyclic redundancy check (CRC) based on the determined transport format.

11. An apparatus for wireless communication, comprising:
a processing system configured to:
receive one or more first signals at a user equipment (UE) during a first portion of a current transmission time interval (TTI), wherein the one or more first signals are transmitted by a network to the UE using a transport format of multiple transport formats;
determine, based on information of one or more previous TTIs received by the UE and based on bit energies of bits in the one or more first signals, the transport format upon receiving the one or more first signals and prior to a second portion of the current TTI subsequent to the first portion of the current TTI, the position of the bits in each of the multiple transport formats being fixed and the bit energies of the bits having different values depending on the transport format; and
perform one or more operations at the UE during the second portion of the current TTI based on the determined transport format.

12. The apparatus of claim 11, wherein the processing system determines the transport format based on information regarding transport format patterns that the network uses for communicating with the UE during at least one of a voice activity (VA) mode or a silent activity (SA) mode, wherein the first signals comprise packet types that include at least one of a full rate (FR) packet, a silent insertion descriptor (SID) packet, or a NULL packet.

13. The apparatus of claim 11, wherein the processing system determines the transport format based on a previously determined transport format of a previous TTI at the UE.

14. The apparatus of claim 11, wherein the processing system determines the transport format based on one or more of a cyclic redundancy check (CRC) on decoded data at the UE and a current mode of the UE, wherein the current mode of the UE is one of a voice activity (VA) mode or a silent activity (SA) mode.

15. The apparatus of claim 14, wherein the processing system is further configured to:
    maintain the current mode when the CRC has failed; and
    transition from the current mode to a complementary mode of the current mode when the CRC has passed and the transport format corresponds to either the complementary mode or a transition transport format.

16. The apparatus of claim 11, wherein the processing system determines the transport format by:
    determining a first transport format based on one or more previously determined transport formats of previous TTIs at the UE;
    determining a second transport format based on the bit energies of the bits in the one or more first signals; and
    determining the transport format based on the first transport format and the second transport format.

17. The apparatus of claim 16, wherein the processing system determines the second transport format by determining an estimated signal power at the UE by:
    determining a number of bits, a power estimate, and a power offset for one or more slots of a dedicated physical channel (DPCH), wherein the number of bits is fixed irrespective of the multiple transport formats, and wherein the power offset is calculated relative to a transmit power of a dedicated physical data channel;
    determining a transmit power contribution for each of the one or more slots based on the number of bits, the power estimate, and the power offset of the one or more slots;
    scaling the transmit power contribution of each of the one or more slots to obtain scaled transmit power contributions of the one or more slots by a weight corresponding to a power adjustment using downlink transmit power control (TPC) bits; and
    determining the estimated signal power based on the scaled transmit power contributions.

18. The apparatus of claim 16, wherein the processing system is further configured to:
    determine the bit energies based on a noise power estimate corresponding to a plurality of channels transmitting at least one symbol or transmitting no symbols, wherein the processing system determines the bit energies by:
        determining a total received power for each of the plurality of channels;
        determining a signal power estimate for each symbol in the plurality of channels;
        determining single channel noise power estimates for each of the plurality of channels based on the total received power and the signal power estimate; and
        combining the single channel noise power estimates to obtain the noise power estimate.

19. The apparatus of claim 18, wherein the plurality of channels comprises a dedicated physical channel (DPCH), a primary common connection physical channel (P-CCPH), or a synchronization channel (SCH), or a channel that employs an orthogonal variable spreading factor (OVSF) code with a spreading factor of 256.

20. An apparatus for wireless communication, comprising:
    means for receiving one or more first signals at a user equipment (UE) during a first portion of a current transmission time interval (TTI), wherein the one or more first signals are transmitted by a network to the UE using a transport format of multiple transport formats;
    means for determining, based on information of one or more previous TTIs received by the UE and based on bit energies of bits in the one or more first signals, the transport format upon receiving the one or more first signals and prior to a second portion of the current TTI subsequent to the first portion of the current TTI, the position of the bits in each of the multiple transport formats being fixed and the bit energies of the bits having different values depending on the transport format; and
    means for performing one or more operations at the UE during the second portion of the current TTI based on the determined transport format.

21. The apparatus of claim 20, wherein the means for determining the transport format determines the transport format based on information regarding transport format patterns that the network uses for communicating with the UE during at least one of a voice activity (VA) mode or a silent activity (SA) mode, wherein the first signals comprise packet types that include at least one of a full rate (FR) packet, a silent insertion descriptor (SID) packet, or a NULL packet.

22. The apparatus of claim 20, wherein the means for determining the transport format determines the transport format based on a previously determined transport format of a previous TTI at the UE.

23. The apparatus of claim 20, wherein the means for determining the transport format determines the transport format based on one or more of a cyclic redundancy check (CRC) on decoded data at the UE and a current mode of the UE, wherein the current mode of the UE is one of a voice activity (VA) mode or a silent activity (SA) mode.

24. The apparatus of claim 23, further comprising:
    means for maintaining the current mode when the CRC has failed; and
    means for transitioning from the current mode to a complementary mode of the current mode when the CRC has passed and the transport format corresponds to either the complementary mode or a transition transport format.

25. The apparatus of claim 20, wherein the means for determining the transport format determines the transport format by:
    determining a first transport format based on one or more previously determined transport formats of previous TTIs at the UE;
    determining a second transport format based on the bit energies of the bits in the one or more first signals; and
    determining the transport format based on the first transport format and the second transport format.

26. The apparatus of claim 25, wherein the means for determining the transport format determines the second transport format by determining an estimated signal power at the UE by:
    determining a number of bits, a power estimate, and a power offset for one or more slots of a dedicated physical channel (DPCH), wherein the number of bits is fixed irrespective of the multiple transport formats, and wherein the power offset is calculated relative to a transmit power of a dedicated physical data channel;
    determining a transmit power contribution for each of the one or more slots based on the number of bits, the power estimate, and the power offset of the one or more slots;

scaling the transmit power contribution of each of the one or more slots to obtain scaled transmit power contributions of the one or more slots by a weight corresponding to a power adjustment using downlink transmit power control (TPC) bits; and determining the estimated signal power based on the scaled transmit power contributions.

27. The apparatus of claim 25, further comprising:

means for determining the bit energies based on a noise power estimate corresponding to a plurality of channels transmitting at least one symbol or transmitting no symbols, wherein the means for determining the bit energies determines the bit energies by:

determining a total received power for each of the plurality of channels;

determining a signal power estimate for each symbol in the plurality of channels;

determining single channel noise power estimates for each of the plurality of channels based on the total received power and the signal power estimate; and combining the single channel noise power estimates to obtain the noise power estimate.

28. A computer program product for wireless communication, comprising:

a non-transitory computer-readable medium comprising:

code for receiving one or more first signals at a user equipment (UE) during a first portion of a current transmission time interval (TTI), wherein the one or more first signals are transmitted by a network to the UE using a transport format of multiple transport formats;

code for determining, based on information of one or more previous TTIs received by the UE and based on bit energies of bits in the one or more first signals, the transport format upon receiving the one or more first signals and prior to a second portion of the current TTI subsequent to the first portion of the current TTI, the position of the bits in each of the multiple transport formats being fixed and the bit energies of the bits having different values depending on the transport format; and code for performing one or more operations at the UE during the second portion of the current TTI based on the determined transport format.

* * * * *